(12) United States Patent
Luo et al.

(10) Patent No.: US 9,758,674 B2
(45) Date of Patent: *Sep. 12, 2017

(54) POLYARYLENE SULFIDE FOR OIL AND GAS FLOWLINES

(71) Applicant: Ticona LLC, Florence, KY (US)

(72) Inventors: Rong Luo, Florence, KY (US); Xinyu Zhao, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 26 days.

This patent is subject to a terminal disclaimer.

(21) Appl. No.: 13/804,481

(22) Filed: Mar. 14, 2013

(65) Prior Publication Data

US 2013/0273288 A1 Oct. 17, 2013

Related U.S. Application Data

(60) Provisional application No. 61/623,618, filed on Apr. 13, 2012, provisional application No. 61/665,423, (Continued)

(51) Int. Cl.
*C08L 81/04* (2006.01)
*F16L 11/04* (2006.01)
(Continued)

(52) U.S. Cl.
CPC ............ *C08L 81/04* (2013.01); *B32B 27/286* (2013.01); *F16L 11/083* (2013.01); *Y10T 428/1352* (2015.01); *Y10T 428/1393* (2015.01)

(58) Field of Classification Search
CPC ...... C08L 81/02; C08L 81/04; C08L 2666/02; F16L 11/00; F16L 11/083; F16L 11/04;
(Continued)

(56) References Cited

U.S. PATENT DOCUMENTS 3,354,129 A 11/1967 Edmonds, Jr. et al.
3,610,698 A 10/1971 Gachot et al.
(Continued)

FOREIGN PATENT DOCUMENTS

CA 2032370 6/1991
CN 2627320 7/2004
(Continued)

OTHER PUBLICATIONS

International Search Report and Written Opinion for PCT/US2013/036365 dated May 9, 2014, 10 pages.
(Continued)

*Primary Examiner* — Yan Lan
(74) *Attorney, Agent, or Firm* — Dority & Manning, P.A.

(57) ABSTRACT

Flowlines for use in oil and gas applications are described. The flowlines include a barrier layer that includes polyarylene sulfide composition that exhibits high strength and flexibility characteristics. Methods for forming the flowlines are also described. Formation methods include dynamic vulcanization of a polyarylene sulfide composition that includes an impact modifier dispersed throughout the polyarylene sulfide. A crosslinking agent is combined with the other components of the composition following dispersal of the impact modifier throughout the composition. The flowlines can include production fluid flowlines, supporting fluid flowlines, bundled flowlines, etc. and can be utilized as risers, pipelines, jumpers, and the like.

32 Claims, 12 Drawing Sheets

Related U.S. Application Data filed on Jun. 28, 2012, provisional application No. 61/675,002, filed on Jul. 24, 2012, provisional application No. 61/707,355, filed on Sep. 28, 2012, provisional application No. 61/717,922, filed on Oct. 24, 2012.

(51) Int. Cl.
 *B32B 27/28* (2006.01)
 *F16L 11/08* (2006.01)

(58) Field of Classification Search
 CPC .... F16L 11/085; F16L 2011/047; F16L 57/04; F16L 57/06; F16L 58/04; F16L 9/133; F16L 9/147; C08F 283/00; Y10T 428/1352; Y10T 428/1386; Y10T 428/139; Y10T 428/1393; Y10T 428/1397; Y10T 428/2958; B32B 1/08; B32B 2307/558; B32B 27/18; B32B 27/286; B32B 2270/00
 USPC .............. 428/36.9, 36.91, 36.92, 35.7, 36.8; 525/189, 502, 134; 264/41; 522/109, 522/110, 73
 See application file for complete search history.

(56) References Cited

U.S. PATENT DOCUMENTS

| | | | |
|---|---|---|---|
| 3,919,177 A | 11/1975 | Campbell | |
| 4,337,329 A | 6/1982 | Kubo et al. | |
| 4,368,321 A | 1/1983 | Sherk et al. | |
| 4,371,671 A | 2/1983 | Anderson | |
| 4,384,081 A | 5/1983 | Kubo et al. | |
| 4,400,110 A | 8/1983 | Beynet et al. | |
| 4,452,951 A | 6/1984 | Kubo et al. | |
| 4,464,515 A | 8/1984 | Rempel et al. | |
| 4,503,196 A | 3/1985 | Rempel et al. | |
| 4,581,417 A | 4/1986 | Buding et al. | |
| 2,418,255 A | 8/1987 | Chacko et al. | |
| 4,689,365 A | 8/1987 | Chacko et al. | |
| 4,735,267 A | 4/1988 | Stevens | |
| 4,814,430 A | 3/1989 | Iwasaki et al. | |
| 4,889,893 A | 12/1989 | Kobayashi et al. | |
| 5,006,605 A | 4/1991 | Mizuno et al. | |
| 5,015,704 A * | 5/1991 | Takekoshi et al. | 525/537 |
| 5,038,833 A | 8/1991 | Brunnnhofer | |
| 5,047,465 A | 9/1991 | Auerbach | |
| 5,087,666 A | 2/1992 | Yu et al. | |
| 5,129,459 A | 7/1992 | Breese et al. | |
| 5,149,731 A | 9/1992 | Uota et al. | |
| 5,240,973 A | 8/1993 | Katoh et al. | |
| 5,240,988 A | 8/1993 | Kohler et al. | |
| 5,248,730 A | 9/1993 | Yamao | |
| 5,270,305 A | 12/1993 | Palmer | |
| 5,380,783 A | 1/1995 | Satake et al. | |
| 5,397,839 A | 3/1995 | Patel | |
| 5,458,440 A | 10/1995 | Van Helvoirt | |
| 5,476,120 A | 12/1995 | Brunnhofer | |
| 5,504,141 A | 4/1996 | Collard et al. | |
| 5,578,679 A | 11/1996 | Suzuki et al. | |
| 5,582,252 A | 12/1996 | Richmond et al. | |
| 5,589,544 A | 12/1996 | Horrion | |
| 5,625,002 A | 4/1997 | Kadoi et al. | |
| 5,652,287 A | 7/1997 | Sullivan et al. | |
| 5,654,358 A | 8/1997 | Kadoi et al. | |
| 5,654,383 A | 8/1997 | Köhler et al. | |
| 5,668,214 A | 9/1997 | Suzuki | |
| 5,718,957 A | 2/1998 | Yokoe et al. | |
| 5,770,313 A | 6/1998 | Furumoto et al. | |
| 5,817,723 A | 10/1998 | Flexman, Jr. et al. | |
| 5,830,965 A | 11/1998 | Imaizumi et al. | |
| 5,837,758 A | 11/1998 | Brown et al. | |
| 5,840,830 A | 11/1998 | Miyahara et al. | |
| 5,860,682 A * | 1/1999 | Belcher | 285/222.1 |
| 5,876,548 A | 3/1999 | Strassel et al. | |
| 5,919,326 A | 7/1999 | Yokoe et al. | |
| 6,001,934 A * | 12/1999 | Yamanaka et al. | 525/383 |
| 6,015,858 A | 1/2000 | Gornowicz | |
| 6,020,431 A | 2/2000 | Venkataswamy et al. | |
| 6,039,083 A | 3/2000 | Loper | |
| 6,117,950 A | 9/2000 | Yamao et al. | |
| 6,155,305 A | 12/2000 | Sumner | |
| 6,176,268 B1 | 1/2001 | Hsich et al. | |
| 6,182,705 B1 | 2/2001 | Sumner | |
| 6,225,416 B1 | 5/2001 | Reil et al. | |
| 6,267,537 B1 | 7/2001 | Breivik et al. | |
| 6,281,286 B1 | 8/2001 | Chorvath et al. | |
| 6,362,287 B1 | 3/2002 | Chorvath et al. | |
| 6,417,293 B1 | 7/2002 | Chorvath et al. | |
| 6,435,124 B1 | 8/2002 | Williams | |
| 6,443,185 B1 | 9/2002 | Katayama et al. | |
| 6,446,673 B1 | 9/2002 | Iio et al. | |
| 6,485,806 B1 | 11/2002 | Tateyama et al. | |
| 6,523,576 B2 | 2/2003 | Imaeda et al. | |
| 6,538,071 B1 | 3/2003 | Fuchs | |
| 6,569,955 B1 | 5/2003 | Brewer et al. | |
| 6,569,958 B1 | 5/2003 | Gross et al. | |
| 6,602,565 B1 | 8/2003 | Katayama et al. | |
| 6,608,136 B1 | 8/2003 | Dean et al. | |
| 6,619,330 B2 | 9/2003 | Ito et al. | |
| 6,637,465 B2 | 10/2003 | Ito et al. | |
| 6,649,704 B2 | 11/2003 | Brewer et al. | |
| 6,653,437 B2 | 11/2003 | Hinokimori et al. | |
| 6,657,014 B1 | 12/2003 | Mori et al. | |
| 6,686,745 B2 | 2/2004 | Bass | |
| 6,699,946 B1 * | 3/2004 | Lambla et al. | 525/537 |
| 6,713,569 B2 | 3/2004 | Chorvath et al. | |
| 6,740,707 B2 | 5/2004 | Ono et al. | |
| 6,740,709 B2 | 5/2004 | Ono et al. | |
| 6,743,868 B2 | 6/2004 | Fournier et al. | |
| 6,849,697 B2 | 2/2005 | Lambla et al. | |
| 6,875,517 B2 | 4/2005 | Bosshammer et al. | |
| 6,888,719 B1 | 5/2005 | Janzen et al. | |
| 6,889,715 B2 | 5/2005 | Fraser et al. | |
| 6,923,845 B2 | 8/2005 | Nichols et al. | |
| 6,926,040 B1 | 8/2005 | Prescott et al. | |
| 6,988,442 B2 | 1/2006 | Fisher | |
| 7,011,114 B2 | 3/2006 | Suzuki et al. | |
| 7,041,741 B2 | 5/2006 | Patel et al. | |
| 7,059,365 B2 | 6/2006 | O'Connell | |
| 7,086,420 B2 | 8/2006 | Kahn et al. | |
| 7,111,646 B2 | 9/2006 | Sato | |
| 7,192,063 B2 | 3/2007 | Takagi et al. | |
| 7,208,207 B2 | 4/2007 | Ono et al. | |
| 7,268,541 B2 | 9/2007 | Buttle et al. | |
| 7,442,744 B2 | 10/2008 | Tokushige et al. | |
| 7,717,138 B2 | 5/2010 | Takagi | |
| 7,784,498 B2 | 8/2010 | Dupoiron et al. | |
| 7,807,245 B2 | 10/2010 | Bersted et al. | |
| 7,810,524 B2 | 10/2010 | Sakazaki | |
| 7,887,660 B2 | 2/2011 | Jeruzal et al. | |
| 7,946,313 B2 | 5/2011 | Vo | |
| 7,960,473 B2 | 6/2011 | Kobayashi et al. | |
| 7,976,920 B2 | 7/2011 | Braad et al. | |
| 7,981,981 B2 | 7/2011 | Ajbani et al. | |
| 8,163,364 B2 | 4/2012 | Braad et al. | |
| 8,210,212 B2 | 7/2012 | Buchner | |
| 8,273,432 B2 | 9/2012 | Mizutani et al. | |
| 8,276,620 B2 | 10/2012 | Vo | |
| 8,322,382 B2 | 12/2012 | Slagsvold et al. | |
| 8,353,316 B2 | 1/2013 | Do | |
| 8,397,765 B2 | 3/2013 | Jackson et al. | |
| 2003/0121560 A1 | 7/2003 | Morohoshi et al. | |
| 2004/0058111 A1 | 3/2004 | Manas-Zloczower et al. | |
| 2005/0089688 A1 | 4/2005 | Mungioli et al. | |
| 2005/0208248 A1 | 9/2005 | Ilo et al. | |
| 2006/0151038 A1 | 7/2006 | Gregrich | |
| 2006/0229417 A1 | 10/2006 | Ferrate et al. | |
| 2008/0120968 A1 | 5/2008 | Beall et al. | |
| 2009/0061134 A1 * | 3/2009 | Ajbani et al. | 428/36.4 |
| 2009/0301594 A1 | 12/2009 | Raudies et al. | |
| 2010/0004375 A1 | 1/2010 | Lalgudi et al. | |

(56) References Cited

U.S. PATENT DOCUMENTS

| | | |
|---|---|---|
| 2010/0048777 A1 | 2/2010 | Kodama et al. |
| 2010/0050606 A1 | 3/2010 | Fulks et al. |
| 2010/0062202 A1 | 3/2010 | Procida |
| 2010/0101675 A1 | 4/2010 | Do et al. |
| 2010/0266790 A1 | 10/2010 | Kusinski et al. |
| 2011/0041947 A1 | 2/2011 | Shafer et al. |
| 2011/0114215 A1 | 5/2011 | Jeruzal et al. |
| 2011/0226375 A1 | 9/2011 | Harris et al. |
| 2011/0232798 A1 | 9/2011 | Braad et al. |
| 2011/0287201 A1 | 11/2011 | Abe et al. |
| 2012/0037397 A1 | 2/2012 | Mhetar |
| 2013/0032240 A1 | 2/2013 | Kuhmann et al. |
| 2013/0059976 A1 | 3/2013 | Matsuo et al. |
| 2013/0273289 A1* | 10/2013 | Luo et al. .................. 428/36.91 |

FOREIGN PATENT DOCUMENTS

| | | |
|---|---|---|
| EP | 0900650 | 3/1999 |
| EP | 1890066 | 2/2008 |
| EP | 2 239 135 A1 | 10/2010 |
| EP | 1561626 | 11/2010 |
| EP | 2418255 | 2/2012 |
| FR | 2617176 | 12/1988 |
| GB | 1558491 | 1/1980 |
| JP | H03-021435 | 1/1991 |
| JP | 06-65376 A | 3/1994 |
| JP | 09-59514 A | 3/1997 |
| JP | 11-124476 A | 5/1999 |
| JP | 2964570 B2 | 10/1999 |
| JP | 3117492 B2 | 12/2000 |
| JP | 2001-115020 A | 4/2001 |
| JP | 2001-279097 A | 10/2001 |
| JP | 2004-300270 A | 10/2004 |
| JP | 3618018 B | 2/2005 |
| JP | 3889122 B | 3/2007 |
| JP | 2007-169550 A | 7/2007 |
| JP | 4061705 B2 | 3/2008 |
| JP | 4235893 B | 3/2009 |
| JP | 4552434 B | 9/2010 |
| JP | 4600015 B | 12/2010 |
| JP | 4600016 B | 12/2010 |
| JP | 2011-020401 A | 2/2011 |
| JP | 5029881 B | 9/2012 |
| JP | 5051428 B | 10/2012 |
| KR | 10-2008-0064041 | 7/2008 |
| WO | WO 91/18055 | 11/1991 |
| WO | WO 94/16018 | 7/1994 |
| WO | WO 2010/121143 | 10/2010 |

OTHER PUBLICATIONS

Chinese Search Report dated Dec. 23, 2015, 2 pages.
Abstract of Japanese Patent—JPH0710994, Jan. 13, 1995, 2 pages.
Search Report for RU application No. 2014145556/06 (073441) dated Mar. 22, 2017, 2 pages.
Abstract of Japanese Patent—JPH06234887A, Aug. 23, 1994, 1 page.
Abstract of Japanese Patent—JP 2004300272A, Oct. 28, 2004, 1 page.
Abstract of Japanese Patent—J 2008110561A, May 15, 2008, 1 page.
Abstract of Japanese Patent—JP 2009256608A, Nov. 5, 2009, 1 page.

* cited by examiner

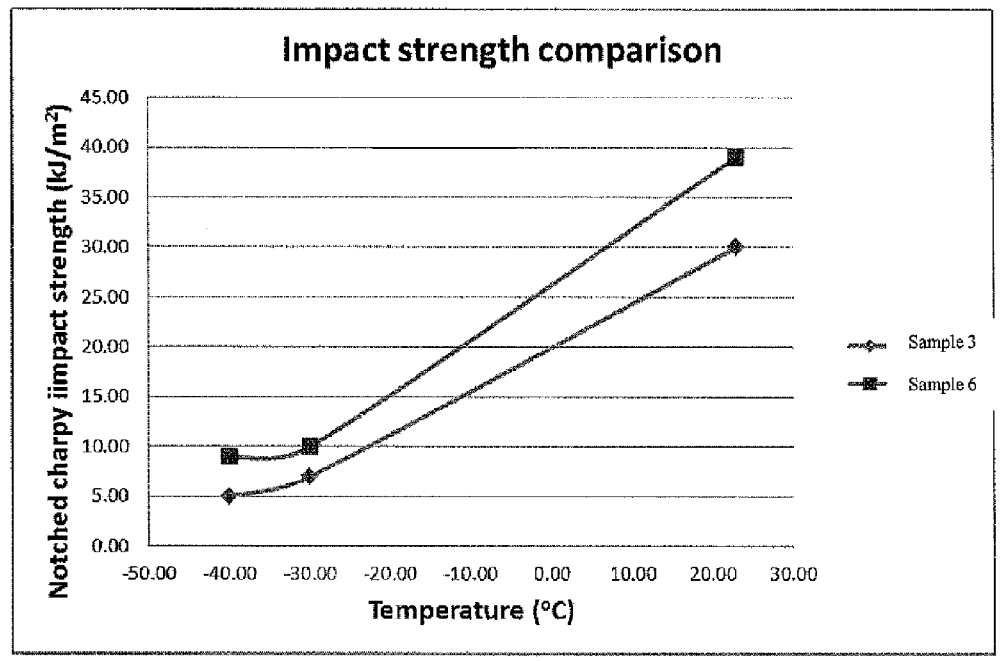
FIG. 11
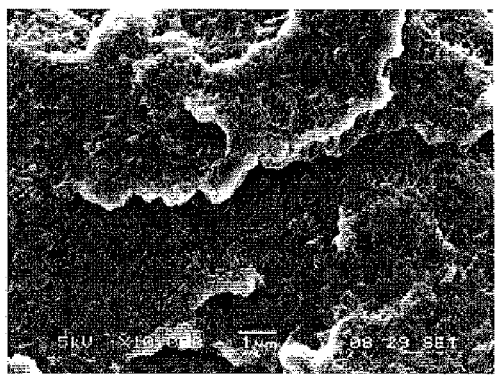
FIG. 12A (Sample 3)
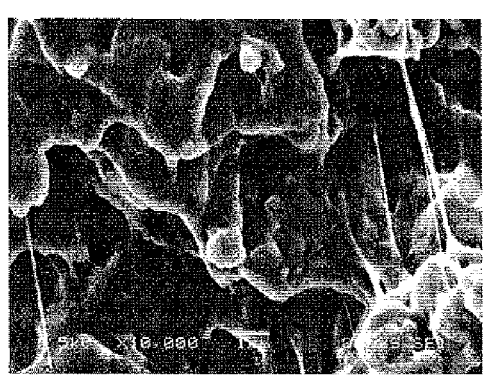
FIG. 12B (Sample 6)

POLYARYLENE SULFIDE FOR OIL AND GAS FLOWLINES

CROSS REFERENCE TO RELATED APPLICATIONS

The present application claims filing benefit of U.S. Provisional Patent Application Ser. No. 61/623,618 having a filing date of Apr. 13, 2012; U.S. Provisional Patent Application Ser. No. 61/665,423 having a filing date of Jun. 28, 2012; U.S. Provisional Patent Application Ser. No. 61/675,002 having a filing date of Jul. 24, 2012; U.S. Provisional Patent Application Ser. No. 61,707,355 having a filing date of Sep. 28, 2012; and U.S. Provisional Patent Application Ser. No. 61/717,922 having a filing date of Oct. 24, 2012; all of which are incorporated herein in their entirety.

BACKGROUND OF THE INVENTION

There are a large number of different flowlines that are utilized in oil and gas productions systems including, for example, production flowlines to carry hydrocarbon products, hydraulic fluid supply lines, injection fluid flowlines, and so forth. Flowlines that carry fluids from the seafloor to the surface are generally termed risers, while flowlines that carry the production fluid to the shore, across the land, to a transportation device or to a storage facility are termed pipelines or export lines. Risers can include production risers, drilling risers, top tensioned risers, and the like. Other flowlines include jumpers that are shorter segments that connect a subsea well back to its manifold, fluid transfer lines that connect riser systems to floating production units, and export flowlines that connect floating production units to off-loading buoys. Multiple flowlines can be combined to form a bundled line, a piggy-back line, or a pipe-in-pipe, and variations of the basic flowline structures are also useful such as flexible catenary risers and hybrid risers. Flexible flowlines have become more attractive for use in such oil and gas applications as they can have high strength and durability, for instance equivalent to that of rigid steel flowlines, while the flexibility of the systems can better function in the dynamic offshore environments in which they are used.

The formation of flexible flowlines that can successfully function in the challenging environments of oil and gas production systems has proven both difficult and expensive. The flowlines must be able to carry the desired fluids such as the recovered hydrocarbon or the supporting fluids including hydraulic fluids and injection fluids without degradation or failure. While single layer flowlines are used in some applications of offshore oil and gas systems, most flexible flowlines for oil and gas applications will include multiple concentric layers that together provide a variety of properties to the flowline such as strength, barrier properties, chemical resistance properties, anti-wear properties, insulation properties, and the like. For instance, one or more inner layers of a flowline can provide barrier properties, preventing permeation of the fluid carried by the flowline through the wall. This layer can also be resistant to chemical degradation by the fluid carried in the flowline and thermal degradation due to the conditions of utilization, so as to maintain the desirable barrier properties over a long life. In addition to good impermeability, chemical and thermal degradation resistance, and flexibility, the material used to form a barrier layer should also exhibit good impact strength at a wide range of temperatures. These barrier layers have typically be formed from polymeric materials including high density polyethylene (HDPE), polyamides (e.g., PA11 or PA12), or polyvinylidene fluoride (PVDF). While these materials can provide adequate barrier layers in many cases, room for improvement remains.

Polyarylene sulfides are high-performance polymers that may withstand high thermal, chemical, and mechanical stresses. Polyarylene sulfides have often been combined with other polymers to improve characteristics of the product composition. For example, elastomeric impact modifiers have been found beneficial for improvement of the physical properties of a polyarylene sulfide composition.

Unfortunately, elastomeric polymers generally considered useful for impact modification are not compatible with polyarylene sulfides and phase separation has been a problem in forming compositions of the two. Attempts have been made to improve the composition formation, for instance through the utilization of compatibilizers. However, even upon such modifications, compositions including polyarylene sulfides in combination with impact modifying polymers still have failed to provide product performance as desired, particularly in challenging applications such as in forming a flexible flowline for use in oil and gas applications that requires flexibility, impermeability, high heat and chemical degradation resistance as well as high impact resistance.

What are needed in the art are flowlines for use in offshore oil and gas applications that include a polyarylene sulfide composition, for instance as a barrier layer of the flowline.

SUMMARY OF THE INVENTION

Disclosed in one embodiment is a flowline for use in oil and/or gas production and transport applications. The oil and/or gas flowline includes a polyarylene sulfide composition. The polyarylene sulfide composition includes a polyarylene sulfide and a crosslinked impact modifier. The polyarylene sulfide composition can exhibit excellent characteristics for use in oil and gas applications. For instance, the polyarylene sulfide composition can have an elongation at yield of greater than about 4.5% and can have a tensile modulus of less than about 3000 MPa as determined according to ISO Test No. 527 at a temperature of 23° C. and a speed of 5 mm/min.

Also disclosed is a method for forming an oil and/or gas flowline, the method including shaping the polyarylene sulfide composition to form the oil and gas flowline, for instance to form one or more layers of a flowline.

BRIEF DESCRIPTION OF THE FIGURES

The present disclosure may be better understood with reference to the following figures:

FIG. 11 illustrates the effect of temperature change on the notched Charpy impact strength of a polyarylene sulfide composition as described herein and that of a comparison composition.

FIG. 12 is a scanning electron microscope image of a polyarylene sulfide composition as described herein (FIG. 12B) and a comparison polyarylene sulfide (FIG. 12A).

DETAILED DESCRIPTION

Figure 1:
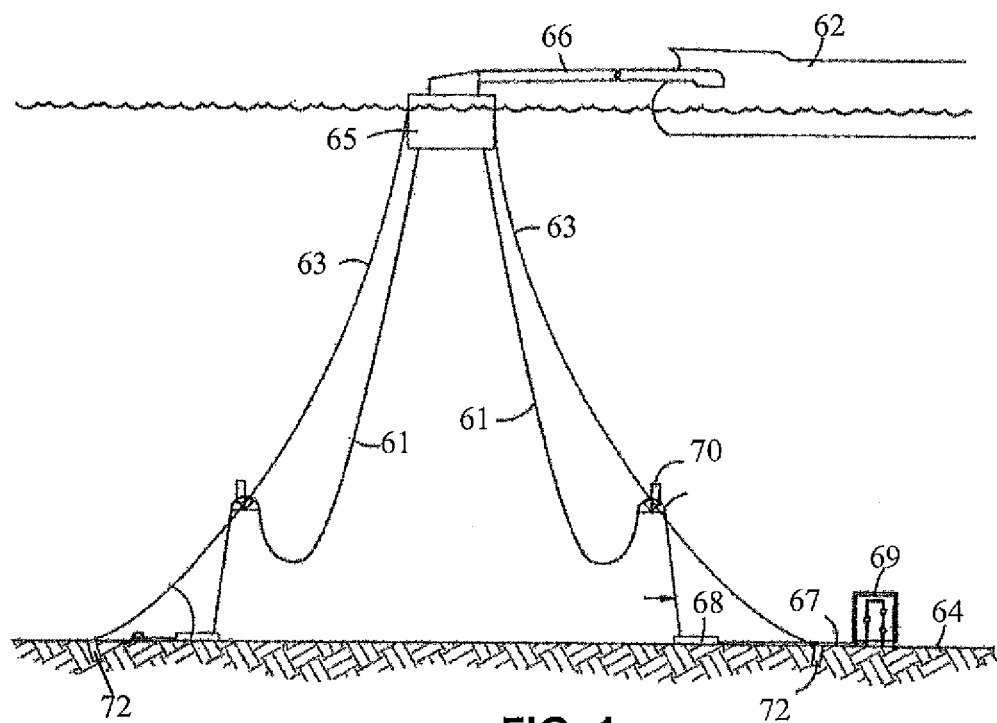
FIG. 1 illustrates an offshore oil and gas system including a flexible riser flowline extending from the sea floor to a surface unit.

It is to be understood by one of ordinary skill in the art that the present discussion is a description of exemplary embodiments only, and is not intended as limiting the broader aspects of the present disclosure.

The present disclosure is generally directed to flowlines for use in oil and/or gas production systems. More specifically, the flowlines are either formed of the polyarylene sulfide composition or include a barrier layer formed of a polyarylene sulfide composition that exhibits high strength, low permeability, and resistance to chemical and thermal degradation. The flowlines have a generally tubular shape and a hollow passage therethrough so as to be utilized to carry any of a multitude of fluids that may be utilized in an oil and/or gas production operation including, without limitation production hydrocarbons and supporting fluids such as injection fluids, hydraulic fluids, waste water, etc. Beneficially, the polyarylene sulfide composition can maintain good physical characteristics even when utilized in extreme temperature applications such as may be encountered during the lifetime of the flowline. In addition, the excellent flexibility and elasticity of the polyarylene sulfide composition can provide benefit in production applications as the flowlines can successfully withstand both vertical and horizontal movement, making them ideal for use with offshore facilities including floating facilities as well as with onshore facilities.

The polyarylene sulfide composition used to form the flowlines can be formed according to a melt processing technique that includes combining a polyarylene sulfide with an impact modifier to form a mixture and subjecting the mixture to dynamic vulcanization. More specifically, the polyarylene sulfide can be combined with the impact modifier and this mixture can be subjected to shear conditions such that the impact modifier becomes well distributed throughout the polyarylene sulfide. Following formation of the mixture, a polyfunctional crosslinking agent can be added to the mixture. The polyfunctional crosslinking agent can react with the components of the mixture to form crosslinks in the composition, for instance within and between the polymer chains of the impact modifier. In one embodiment, the polyarylene sulfide can also be treated with a secondary functional material to form additional reactive functionality on the polyarylene sulfide, which can further improve interaction and crosslinking between the components of the composition.

Without being bound to any particular theory, it is believed that by adding the polyfunctional crosslinking agent to the polyarylene sulfide composition following distribution of the impact modifier throughout the polyarylene sulfide and dynamically vulcanizing the composition, interaction between the polyarylene sulfide, the impact modifier, and the crosslinking agent within the melt processing unit can be improved, leading to improved distribution of the crosslinked impact modifier throughout the composition. The improved distribution of the crosslinked impact modifier throughout the composition can improve the strength and flexibility characteristics of the composition, e.g., the ability of the composition to maintain strength under deformation, as well as provide a composition with good processibility that can be utilized to form a flowline that can exhibit excellent impermeability and resistance to degradation under a variety of conditions.

The high strength and flexibility characteristics of the polyarylene sulfide composition can be evident by examination of the tensile, flexural, and/or impact properties of the materials. For example, the polyarylene sulfide composition can have a notched Charpy impact strength of greater than about 3 $kJ/m^2$, greater than about 3.5 $kJ/m^2$, greater than about 5 $kJ/m^2$, greater than about 10 $kJ/m^2$, greater than about 15 $kJ/m^2$, greater than about 30 $kJ/m^2$, greater than about 33 $kJ/m^2$, greater than about 40 $kJ/m^2$, greater than about 45 $kJ/m^2$, or greater than about 50 $kJ/m^2$ as determined according to ISO Test No. 179-1 (technically equivalent to ASTM D256, Method B) at 23° C. The unnotched Charpy samples do not break under testing conditions of ISO Test No. 180 at 23° C. (technically equivalent to ASTM D256).

Beneficially, the polyarylene sulfide composition can maintain good physical characteristics even at extreme temperatures, including both high and low temperatures. For instance, the polyarylene sulfide composition can have a notched Charpy impact strength of greater than about 8 $kJ/m^2$, greater than about 9 $kJ/m^2$, greater than about 10 $kJ/m^2$, greater than about 14 $kJ/m^2$, greater than about 15 $kJ/m^2$, greater than about 18 $kJ/m^2$, or greater than about 20 $kJ/m^2$ as determined according to ISO Test No. 179-1 at −30° C.; and can have a notched Charpy impact strength of greater than about 8 $kJ/m^2$, greater than about 9 $kJ/m^2$, greater than about 10 $kJ/m^2$, greater than about 11 $kJ/m^2$, greater than about 12 kJ/m², or greater than about 15 kJ/m² as determined according to ISO Test No. 179-1 at −40° C.

Moreover, the effect of temperature change on the polyarylene sulfide composition can be surprisingly small. For instance, the ratio of the notched Charpy impact strength as determined according to ISO Test No. 179-1 at 23° C. to that at −30° C. can be greater than about 3.5, greater than about 3.6, or greater than about 3.7. Thus, and as described in more detail in the example section below, as the temperature increases the impact strength of the polyarylene sulfide composition also increases, as expected, but the rate of increase of the impact strength is very high, particularly as compared to a composition that does not include the dynamically crosslinked impact modifier. Accordingly, the polyarylene sulfide composition can exhibit excellent strength characteristics at a wide range of temperatures.

The polyarylene sulfide composition can exhibit very good tensile characteristics. For example, the polyarylene sulfide composition can have a tensile elongation at yield of greater than about 4.5%, greater than about 6%, greater than about 7%, greater than about 10%, greater than about 25%, greater than about 35%, greater than about 50%, greater than about 70%, greater than about 75%, greater than about 80%, or greater than about 90%. Similarly, the tensile elongation at break can be quite high, for instance greater than about 10%, greater than about 25%, greater than about 35%, greater than about 50%, greater than about 70%, greater than about 75%, greater than about 80%, or greater than about 90%. The strain at break can be greater than about 5%, greater than about 15%, greater than about 20%, or greater than about 25%. For instance the strain at break can be about 90%. The yield strain can likewise be high, for instance greater than about 5%, greater than about 15%, greater than about 20%, or greater than about 25%. The yield stress can be, for example, greater than about 50% or greater than about 53%. The polyarylene sulfide composition may have a tensile strength at break of greater than about 30 MPa, greater than about 35 MPa, greater than about 40 MPa, greater than about 45 MPa, or greater than about 70 MPa.

In addition, the polyarylene sulfide composition can have a relatively low tensile modulus. For instance, the polyarylene sulfide composition can have a tensile modulus less than about 3000 MPa, less than about 2300 MPa, less than about 2000 MPa, less than about 1500 MPa, or less than about 1100 MPa as determined according to ISO Test No. 527 at a temperature of 23° C. and a test speed of 5 mm/min.

The polyarylene sulfide composition can exhibit good characteristics after annealing as well. For instance, following annealing at a temperature of about 230° C. for a period of time of about 2 hours, the tensile modulus of the composition can be less than about 2500 MPa, less than about 2300 MPa, or less than about 2250 MPa. The tensile strength at break after annealing can be greater than about 50 MPa, or greater than about 55 MPa, as measured according to ISO Test No. 527 at a temperature of 23° C. and a test speed of 5 mm/min.

The polyarylene sulfide composition can also be utilized continuously at high temperature, for instance at a continuous use temperature of up to about 150° C., about 160° C., or about 165° C. without loss of tensile strength. For example, the polyarylene sulfide composition can maintain greater than about 95%, for instance about 100% of the original tensile strength after 1000 hours of heat aging at 165° C. and can maintain greater than about 95%, for instance about 100% of the original tensile elongation at yield after 1000 hours heat aging at 135° C.

Tensile characteristics can be determined according to ISO Test No. 527 at a temperature of 23° C. and a test speed of 5 mm/min or 50 mm/min (technically equivalent to ASTM D623 at 23° C.).

The flexural characteristics of the composition can be determined according to ISO Test No. 178 (technically equivalent to ASTM D790 at a temperature of 23° C. and a testing speed of 2 mm/min. For example, the flexural modulus of the composition can be less than about 2500 MPa, less than about 2300 MPa, less than about 2000 MPa, less than about 1800 MPa, or less than about 1500 MPa. The polyarylene sulfide composition may have a flexural strength at break of greater than about 30 MPa, greater than about 35 MPa, greater than about 40 MPa, greater than about 45 MPa, or greater than about 70 MPa.

The deflection temperature under load of the polyarylene sulfide composition can be relatively high. For example, the deflection temperature under load of the polyarylene sulfide composition can be greater than about 80° C., greater than about 90° C., greater than about 100° C., or greater than about 105° C., as determined according to ISO Test No. 75-2 (technically equivalent to ASTM D790) at 1.8 MPa.

The Vicat softening point can be greater than about 200° C. or greater than about 250° C., for instance about 270° C. as determined according to the Vicat A test when a load of 10 N is used at a heating rate of 50 K/hr. For the Vicat B test, when a load of 50 N is used at a heating rate of 50 K/hr, the Vicat softening point can be greater than about 100° C., greater than about 150° C. greater than about 175° C., or greater than about 190° C., for instance about 200° C. The Vicat softening point can be determined according to ISO Test No. 306 (technically equivalent to ASTM D1525).

The polyarylene sulfide composition can also exhibit excellent stability during long term exposure to harsh environmental conditions. For instance, under long term exposure to an acidic environment, the polyarylene sulfide composition can exhibit little loss in strength characteristics. For instance, following 500 hours exposure to a strong acid (e.g., a solution of about 5% or more strong acid such as sulfuric acid, hydrochloric acid, nitric acid, perchloric acid, etc.), the polyarylene sulfide composition can exhibit a loss in Charpy notched impact strength of less than about 17%, or less than about 16% following exposure of about 500 hours to a strong acid solution at a temperature of about 40° C., and can exhibit a loss in Charpy notched impact strength of less than about 25%, or less than about 22% following exposure of about 500 hours to a strong acid solution at a temperature of about 80° C. Even under harsher conditions, for instance in a 10% sulfuric acid solution held at a temperature of about 80° C. for 1000 hours, the polyarylene sulfide composition can maintain about 80% or more of the initial Charpy notched impact strength. The polyarylene sulfide composition can also maintain desirable strength characteristics following exposure to other potentially degrading materials, such as salts.

Permeation resistance can be important for flow lines used in oil and gas applications. The polyarylene sulfide composition can exhibit excellent permeation resistance to a wide variety of materials. For instance, a flow line formed of the polyarylene sulfide composition can exhibit a permeation resistance to a fuel or a fuel source (e.g., gasoline, diesel fuel, jet fuel, unrefined or refined oil, etc.) of less than about 3 g-mm/m²-day, less than about 2 g-mm/m²-day, less than about 1 g-mm/m²-day, or less than about 0.5 g-mm/m²-day. By way of example, the polyarylene sulfide composition (or a flow line or layer of a flow line formed of the polyarylene sulfide composition) can exhibit a permeation resistance to an ethanol blend of ethanol/iso-octane/toluene at a weight ratio of 10:45:45 at 40° C. of less than about 3 g-mm/m²-day, less than about 2.5 g-mm/m²-day, less than about 1 g-mm/m²-day, or less than about 0.1 g-mm/m²-day. The permeation resistance to a blend of 15 wt. % methanol and 85 wt. % oxygenated fuel (CM15A) at 40° C. can be less than about 3 g-mm/m²-day, less than about 2.5 g-mm/m²-day, less than about 1 g-mm/m²-day, less than about 0.5 g-mm/m²-day, less than about 0.3 g-mm/m²-day, or less than about 0.15 g-mm/m²-day. The permeation resistance to methanol at 40° C. can be less than about 1 g-mm/m²-day, less than about 0.5 g-mm/m²-day, less than about 0.25 g-mm/m²-day, less than about 0.1 g-mm/m²-day, or less than about 0.06 g-mm/m²-day. Permeation resistance can be determined according to SAE Testing Method No. J2665. In addition, the polyarylene sulfide composition can maintain original density following long term exposure to hydrocarbons. For example, the composition can maintain greater than about 95% of original density, greater than about 96% of original density, such as about 99% of original density following long term (e.g., greater than about 14 days) exposure to hydrocarbons such as heptane, cyclohexane, toluene, and so forth, or combinations of hydrocarbons.

The polyarylene sulfide composition can also be resistant to uptake of materials, and specifically hydrocarbons. For example, a molded structure formed of the composition can exhibit a volume change of less than about 25%, less than about 20%, or less than about 14% following exposure to the hydrocarbon at a temperature of 130° C. for a period of time of about two weeks.

The polyarylene sulfide composition can exhibit good heat resistance and flame retardant characteristics. For instance, the composition can meet the V-0 flammability standard at a thickness of 0.2 millimeters. The flame retarding efficacy may be determined according to the UL 94 Vertical Burn Test procedure of the "Test for Flammability of Plastic Materials for Parts in Devices and Appliances", 5th Edition, Oct. 29, 1996. The ratings according to the UL 94 test are listed in the following table:

| Rating | Afterflame Time (s) | Burning Drips | Burn to Clamp |
|---|---|---|---|
| V-0 | <10 | No | No |
| V-1 | <30 | No | No |
| V-2 | <30 | Yes | No |
| Fail | <30 | | Yes |
| Fail | >30 | | No |

The "afterflame time" is an average value determined by dividing the total afterflame time (an aggregate value of all samples tested) by the number of samples. The total afterflame time is the sum of the time (in seconds) that all the samples remained ignited after two separate applications of a flame as described in the UL-94 VTM test. Shorter time periods indicate better flame resistance, i.e., the flame went out faster. For a V-0 rating, the total afterflame time for five (5) samples, each having two applications of flame, must not exceed 50 seconds. Using the flame retardant of the present invention, articles may achieve at least a V-1 rating, and typically a V-0 rating, for specimens having a thickness of 0.2 millimeters.

The polyarylene sulfide composition can also exhibit good processing characteristics, for instance as demonstrated by the melt viscosity of the composition. For instance, the polyarylene sulfide composition can have a melt viscosity of less than about 2800 poise as measured on a capillary rheometer at 316° C. and 400 sec$^{-1}$ with the viscosity measurement taken after five minutes of constant shear. Moreover, the polyarylene sulfide composition can exhibit improved melt stability over time as compared to polyarylene sulfide compositions that do not include crosslinked impact modifiers. Polyarylene sulfide compositions that do not include a crosslinked impact modifier tend to exhibit an increase in melt viscosity over time, while disclosed compositions can maintain or even decrease in melt viscosity over time.

The polyarylene sulfide composition can have a complex viscosity as determined at low shear (0.1 radians per second (rad/s)) and 310° C. of greater than about 10 kPa/sec, greater than about 25 kPa/sec, greater than about 40 kPa/sec, greater than about 50 kPa/sec, greater than about 75 kPa/sec, greater than about 200 kPa/sec, greater than about 250 kPa/sec, greater than about 300 kPa/sec, greater than about 350 kPa/sec, greater than about 400 kPa/sec, or greater than about 450 kPa/sec. Higher value for complex viscosity at low shear is indicative of the crosslinked structure of the composition and the higher melt strength of the polyarylene sulfide composition. In addition, the polyarylene sulfide composition can exhibit high shear sensitivity, which indicates excellent characteristics for use in formation processes such as blow molding and extrusion processing.

Due to the excellent physical characteristics of the polyarylene sulfide composition, and while the polyarylene sulfide composition can be utilized to great benefit as an innermost layer or an inner boundary layer (for instance immediately adjacent to an internal carcass), it can also be utilized to form a single layer flowline or additional layers of a multilayer flowline, for instance one or more anti-wear layers that may be located between the innermost layer and the outermost layer of a multilayer flowline. In addition, the polyarylene sulfide composition can be utilized in forming bonded or unbounded multilayer flowlines as are generally known in the art.

Flowlines that incorporate the polyarylene sulfide composition may be single-layered or multi-layered. When considering a multi-layered flowline, the polyarylene sulfide composition can be utilized to form an inner barrier layer of the flowline, but it should be understood that polyarylene sulfide composition layers of a multi-layer flowline are in no way limited to barrier layers and one or more other layers of a multi-layer flowline may incorporate the polyarylene sulfide composition. In addition, the polyarylene sulfide composition can be used for components of the flowline systems such as fittings and connectors, anchors, moorings, buoys, yokes, and the like.

The flowlines can be utilized according to known practice in any gas and/or oil production facility as is generally known in the art. By way of example, FIG. 1 illustrates a typical offshore facility including flexible risers 61 for conducting production fluid from a subsea facility to a floating vessel 62. The floating vessel 62 is illustrated floating on a body of water having a floor 64. Flexible risers 61 are provided to convey production fluid from a subsea pipeline end manifold 68 through a catenary moored buoy 65 through a yoke 66 to the floating vessel 62. The catenary moored buoy 65 is anchored by anchor lines 63 to anchors 72 provided at the floor 64. The pipeline end manifold 68 is connected by a plurality of flowlines 67 to wells 69.

Flexible risers as illustrated in FIG. 1 can have any suitable configuration. By way of example, they can be designed bonded or unbounded risers and can have a steep S or lazy S configuration or alternatively a steep wave or lazy wave configuration as are known in the art. Standard buoyancy modules 70 as illustrated in FIG. 1 may be utilized in conjunction with the flexible risers to develop the desired configuration as is known. The riser 61 passes over the buoyancy module 70 that can include, e.g., a cradle and a buoy. The buoyancy module 70 can also be attached to the anchor line 63 so as to support the riser 61 and be held in the desired position as determined by the length of the anchor line 63 and the riser 61.

Figure 2:
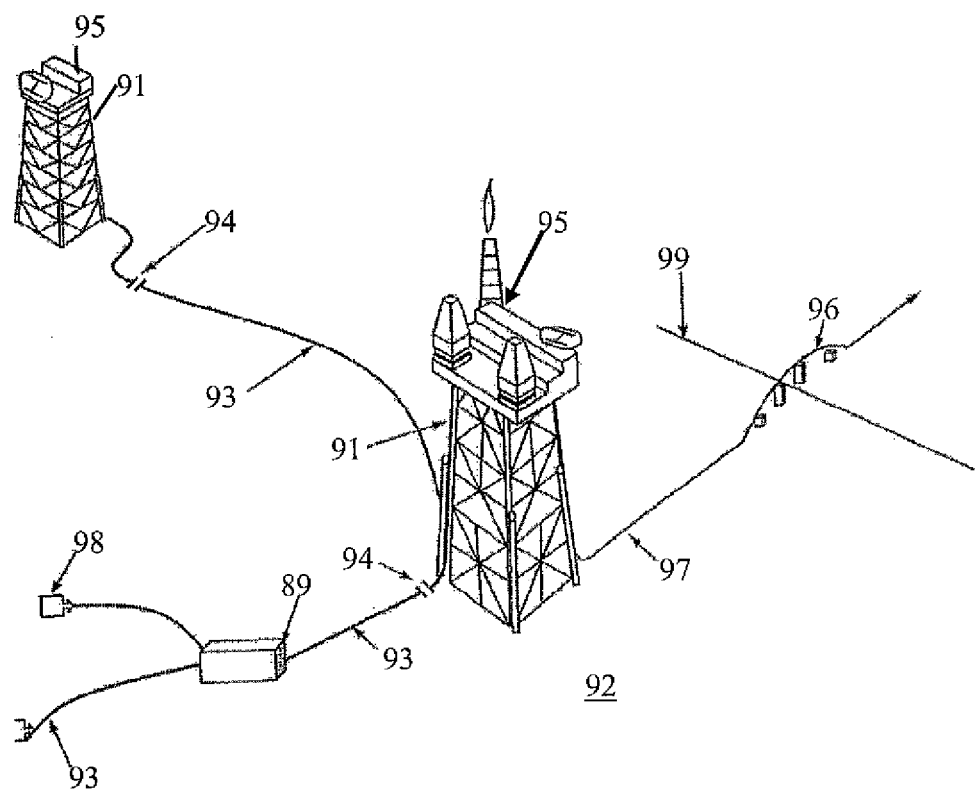
FIG. 2 illustrates an offshore field incorporating multiple different types of flowlines that can include a polyarylene sulfide composition as described herein.

FIG. 2 illustrates a typical offshore field that can incorporate a plurality of different types of flowlines, one or more of which may include at least a barrier layer formed of the polyarylene sulfide composition. As can be seen, the offshore field can include fixed risers 91 that can carry production fluid from the sea floor 92 to a platform 95. The field can include infield flowlines 93 that can carry production fluid, supporting fluids, umbilicals, etc., within the field. In addition, both the risers 91 and the infield flowlines 93 can be bundled lines as discussed above. The system also includes a plurality of tie-ins 94 at which point different flowlines can be merged, for instance to form a bundled riser and/or where individual flowlines may be altered, for instance through expansion. The system also includes a plurality of satellite wells 98 from which the hydrocarbon production fluid is obtained and manifolds. An export pipeline 97 can carry production fluid from the platform 95 to shore, a storage facility, or a transport vessel. The export pipeline 97 may also include one or more crossings 96 to by-pass other flowlines, e.g., another pipeline 99.

Figure 3:
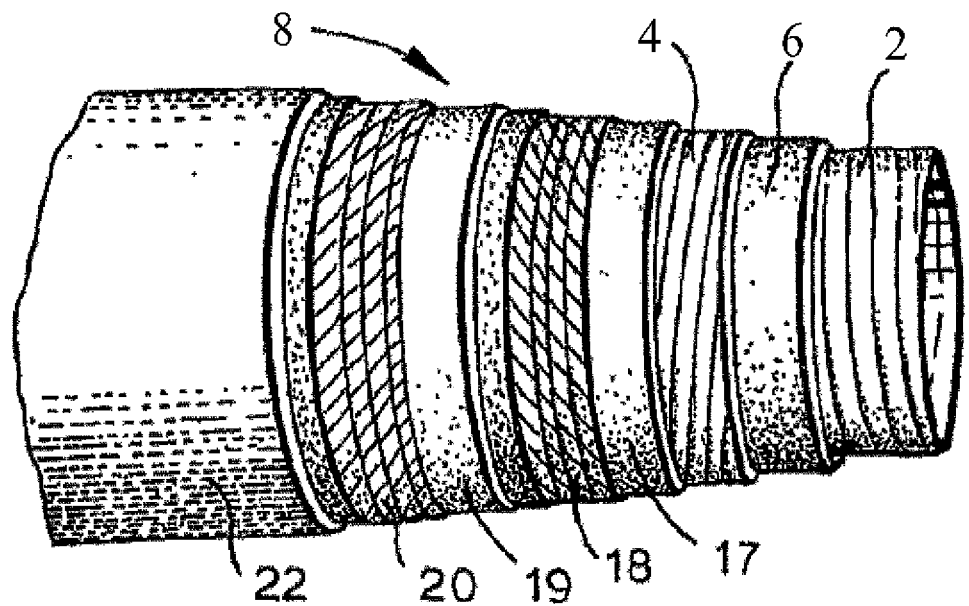
FIG. 3 is a schematic representation of a multilayer riser or pipeline including a barrier layer formed of the polyarylene sulfide composition as described herein.

Referring to FIG. 3, one embodiment of a flexible riser 8 that can incorporate the polyarylene sulfide composition is illustrated. As shown, the riser 8 has several concentric layers. An innermost layer is generally termed the carcass 2 and can be formed of helically wound stainless steel strip so as to provide resistance against external pressures. The carcass 2 is generally a metal (e.g., stainless steel) tube that supports the adjacent barrier layer 6 and prevents riser collapse due to pressure or loads applied during operation. The bore of the flexible riser 8 can vary depending upon the fluid to be carried by the riser. For instance, the riser 8 can have a smooth bore when intended for use to carry a supporting fluid such as an injection fluid (e.g., water and/or methanol) and can have a rough bore when utilized to carry production fluids (e.g., oil and gas). The carcass, when present, can generally be between about 5 and about 10 millimeters in thickness. According to one embodiment, the carcass can be formed by helically wound stainless steel strips that interlock with one another to form the strong, interconnected carcass.

The barrier layer 6 is immediately adjacent the carcass 2. The barrier layer is formed of the polyarylene sulfide composition and provides strength and flexibility while preventing permeation of the fluid carried by the riser through the riser wall. In addition, the barrier layer 6 formed of the polyarylene sulfide composition can resist degradation by both the fluid carried by the riser (e.g., the production fluid, the injection fluid, etc.) as well as by temperature conditions under which the riser is utilized. The barrier layer 6 can generally be between about 3 and about 10 millimeters in thickness and can be extruded from a melt over the carcass 2.

The riser 8 will also include an outer layer 22 that provides an external sleeve and an external fluid barrier as well as providing protection to the riser from external damage due to, e.g., abrasion or encounters with environmental materials. The outer layer 22 can be formed of a polymeric material such as the polyarylene sulfide composition or a high density polyethylene that can resist both mechanical damage and intrusion of seawater to the inner layers of the riser. According to one embodiment, the outer layer 22 can be a composite material that includes a polymeric material in conjunction with a reinforcement material such as carbon fibers, carbon steel fibers, or glass fibers.

A hoop strength layer 4 can be located external to the barrier layer to increase the ability of the riser to withstand hoop stresses caused by forced applied to the riser wall by a pressure differential. The hoop strength layer can generally be a metal layer formed of, e.g., a helically wound strip of carbon steel that can form a layer of from about 3 to about 7 millimeters in thickness. The hoop strength layer can resist both internal pressure and bending of the riser. In one embodiment, the carbon steel strip that forms the hoop strength layer 4 can define an interlocking profile, for instance an S- or Z-cross-sectional configuration, such that adjacent windings interlock with one another to form a stronger layer. In one embodiment, the hoop strength layer can include multiple materials for added strength. For example, in an embodiment in which design and pressure requirements call for higher burst strengths, a second flat metal strip can be helically wound over the interlocked metal strips of the hoop strength layer to provide additional strength for this layer. An intervening polymeric layer such as an anti-wear layer discussed further herein can optionally be located between the two layers of the hoop strength layer as well.

Additional strength layers 18 and 20 can be formed of helically-wound metal (generally carbon steel) strips. The strength layers 18 and 20 can be separated from the hoop strength layer 4 and from each other by polymeric anti-wear layers 17 and 19. The strength layers 18 and 20 can provide additional hoop strength as well as axial strength to the riser. Though the riser 8 includes two strength layers 18, 20, it should be understood that a riser may include any suitable number of strength layers, including no strength layers, one, two, three, or more strength layers. In general, the helically wound metal strips of strength layers 18 and 20 will overlap but need not interlock. As such, the strength layers 18, 20 may have a width of from about 1 millimeter to about 5 millimeters.

The intervening anti-wear layers 17, 19 can be formed of the polyarylene sulfide composition or alternatively can be formed of other polymers such as a polyamide, a high density polyethylene, or the like. In one embodiment, the anti-wear layers 17, 19 can be a composite material that includes unidirectional fibers, for instance carbon or glass fibers. For instance, the anti-wear layers 17, 19 can be formed of a polymer tape or fiber-reinforced polymer tape such as a pultruded polymer tape or ribbon that is helically wound over each strength layer. The anti-wear layers 17, 19 can prevent wear of the adjacent strength layers that can come about due to motion of the strips forming the layers. The anti-wear layers 17, 19 can also prevent birdcaging of the adjacent layers. As with the strength layers 18, 20 of the riser 8, the number of anti-wear layers is not particularly limited, and a riser can include no anti-wear layers, one anti-wear layers, or multiple anti-wear layers depending upon the depth and local environment in which the riser will be utilized, the fluid to be carried by the riser, and so forth. The anti-wear layers 17, 19, can be relatively thin, for instance between about 0.2 and about 1.5 millimeters.

A riser may include additional layers as are generally known in the art. For example, a riser may include an insulation layer, for instance immediately internal to the outer layer 22. An insulation layer, when present can be formed of a foam, fibrous mat, or any other insulation material as is known. By way of example, single or multiple layers of an insulation tape can be wound onto the outer strength layer to form an insulation layer between the outer strength layer 20 and the outer layer 22.

While the above description is for an unbounded flexible riser, it should be understood that the polyarylene sulfide composition may likewise be utilized in forming a bonded flowline. For example, the polyarylene sulfide composition may be utilized in forming a barrier layer and optionally one or more additional layers of a bonded flowline for use in an offshore oil and gas facility.

Other flowlines for use in an offshore facility, for instance jumpers, pipelines, fluid supply lines, etc., can have the same general construction as a riser 8 as illustrated in FIG. 3, or may vary somewhat as to particular layers include in the multilayer flowline. For example, an injection fluid supply line, which supplies injection fluid such as methanol, glycol, and/or water to a well head, need not meet the same performance specifications as a production riser. Accordingly, at least a portion of this flowline need not include all of the various strength-enhancing layers as the riser described above. For instance, flowlines as described herein can include the barrier layer formed of the polyarylene sulfide composition as the innermost layer, in those embodiments in which the flowline specifications do not call for an inner carcass layer as the riser described above.

The diameters of flowlines can also vary widely as is known in the art. For instance, a production fluid riser can generally have a relatively large inner diameter, from about 5 centimeters (about 2 inches) up to about 60 centimeters (about 24 inches) or even greater in some embodiments, while flowlines that carry supporting fluids to or from the well head, the manifold, the storage facility, etc., can be larger or smaller than the production fluid flowlines. For instance, an injection fluid flowline can be smaller than a production fluid flowline, for example, between about 5 centimeters (2 inches) to about 15 centimeters (6 inches) in inner diameter.

Figure 4:
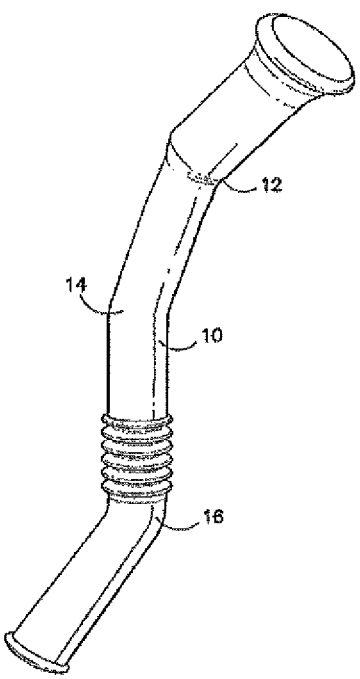
FIG. 4 is a single layer flowline as may be formed from the polyarylene sulfide composition.

Flowlines as encompassed herein can also be single layer flowlines or multilayer bonded flowlines. Referring to FIG. 4, one embodiment of a single layer flowline 10 formed from the polyarylene sulfide composition is shown. As shown, the flowline 10 extends in multiple directions leading to a relatively complex shape. Of course, a less complex shaped single layer flowline is likewise encompassed herein. In one embodiment, to form a more complex shape such as illustrated in FIG. 4, during formation and before the polyarylene sulfide composition can solidify, angular displacements such as shown in FIG. 4 can be formed into the flowline. The flowline 10 includes angular displacement changes at 12, 14 and 16. The flowline may comprise, for instance, a part that may be used in the surface portion of an offshore oil and gas system, for instance in a fixed or floating platform, storage facility, buoy, or the like. For example, a single layer flowline can be utilized to carry injection fluid, hydraulic fluid, or operational fuel on a surface facility.

In addition, a flowline design can vary over the length of the flowline. For instance, as the offshore flowlines reach greater depths, extend to greater offshore distances, and operate at higher pressures, the flowlines that supply supporting fluids to the wells, manifolds, etc. that directly or indirectly support the hydrocarbon product extraction can increase in complexity. Accordingly, the supporting fluids may be supplied to the equipment using flowlines that vary along their length from a flowline that is designed for, e.g., lower pressure operation to a flowline that includes additional reinforcement layers for use in a more extreme environment. As the working pressure of the system increases, the supply pressures and injection pressures also increase. This increase in supply pressure may require that the flowline assemblies also be reinforced and re-engineered around the higher pressures at those locations of the system. Thus, the flowlines may vary in design across the entire length of the line. In any case, at least a portion of the flowlines can include a barrier layer formed of the polyarylene sulfide composition.

Figure 5:
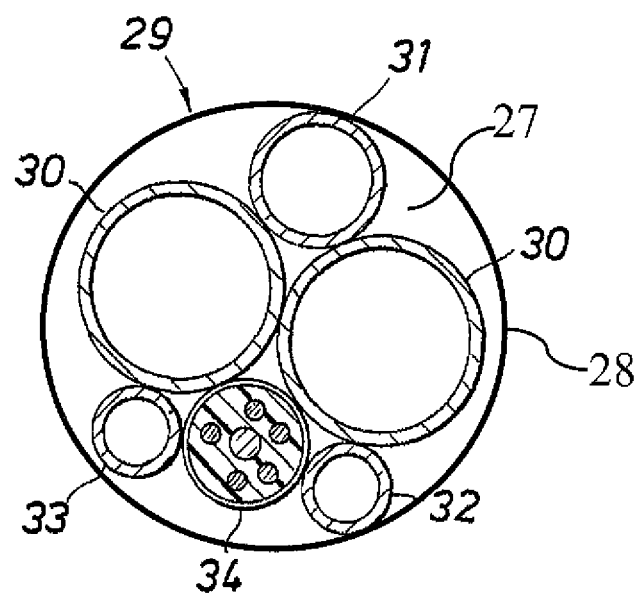
FIG. 5 illustrates a bundled riser including multiple flowlines as described herein.

Flowlines can also be bundled. By way of example, FIG. 5 illustrates a bundled riser 29. The outer casing 28 can be, e.g., a steel casing or a composite casing including multiple polymeric and/or metal layers. The bundled riser 29 includes two production fluid risers 30 that can carry hydrocarbon production fluid from the sea floor to a surface facility. The production fluid risers 30 can be multilayer risers as described above and including a barrier layer formed of the polyarylene sulfide composition. The bundled riser 29 also includes a hydraulic supply flowline 32 that supplies hydraulic fluid to the operating devices located upon the sea floor and an injection fluid flowline 33. The bundled riser 29 includes an annulus line 31, which communicates with the interspaces 27 within the bundled riser 29 and may be used to establish circulation through the production flowlines and the interspaces (or annulus). For instance, a lower end of the annulus line 31 may be connected to a port such as a side port for communication with the interspaces 27. One or more valves can be mounted between the lower end of the annulus line 31 and the interspaces 27 for controlling fluid flow between the annulus line 31 and the interspaces. The bundled riser 29 can also include a control cable 34 that can be used to control the operation of devices located upon any wellhead according to standard practice as is known to the art.

Figure 6:
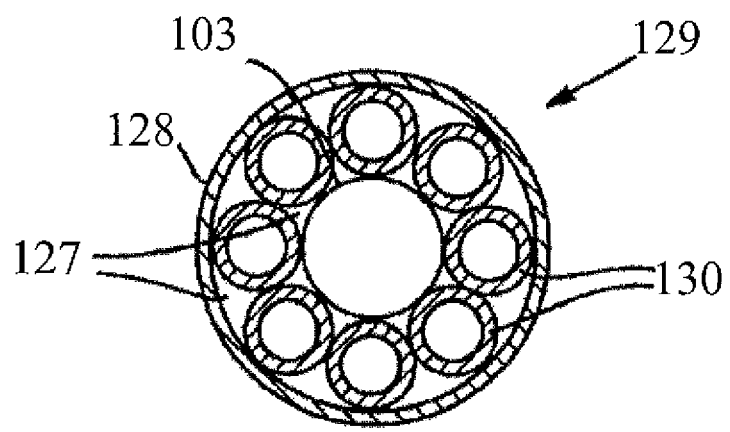
FIG. 6 illustrates another embodiment of a bundled riser.

A bundled riser can include two production fluid risers 30 as illustrated in FIG. 5 or can alternatively carry a single production fluid riser or more than two production fluid risers. For instance, FIG. 6 illustrates a bundled riser 129 that includes an external casing 128 and eight production fluid risers 130. The eight production fluid risers 130 are arranged around a centrally extending conduit or tube 103 and are surrounded by external casing 128. In this arrangement, the production fluid risers 130 border on each other and form a ring and also bear against the inner side of the external casing 128 and against the outer side of the inner conduit 103, which can improve stability of the bundled riser 129 without affecting flexibility. The inner tube 103 can carry additional flowlines, such as a hydraulic flowline, injection fluid flowline, etc. as described. In another embodiment, the inner tube 103 can function as a buoyancy line to supply additional buoyancy to the riser 129. In yet another embodiment, additional flowlines may be located in the interspaces 127 between the production fluid risers 130 and external to the inner tube 103.

Figure 7A:
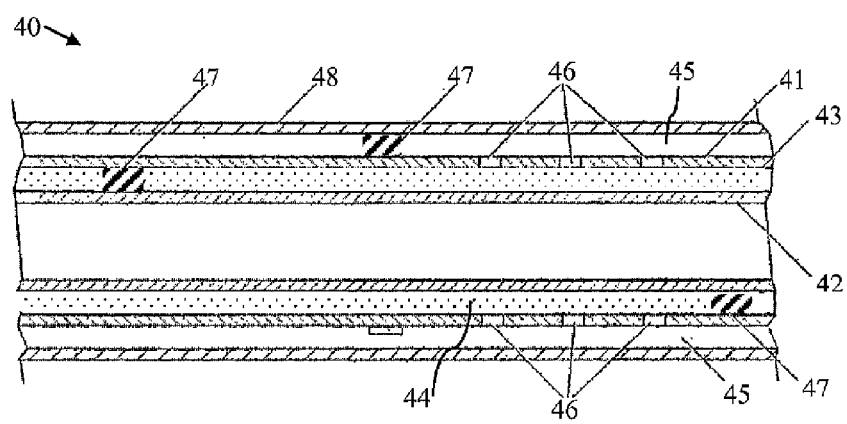
FIG. 7A is a side view and FIG. 7B is a cross-sectional view of a pipe-in-pipe flowline as may include one or more layers formed of the polyarylene sulfide composition.
Figure 7B:
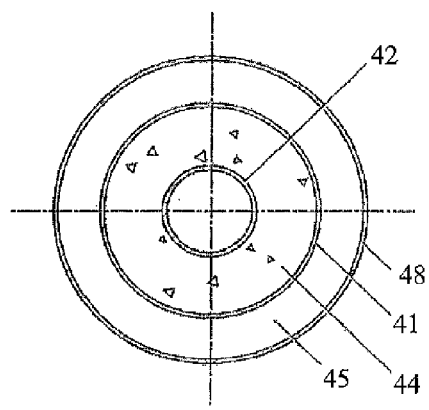

FIG. 7A and FIG. 7B illustrate a pipe-in-pipe arrangement 40 in a side view (FIG. 7A) and a cross sectional view (FIG. 7B) in which one or all of the walls of the lines 48, 41, and 42 can include a barrier layer formed of the polyarylene sulfide composition. In this particular embodiment, the pipe-in-pipe flowline is an insulated flowline that includes an inner production fluid flowline 42 encased in an external casing 48. The inner production fluid flowline 42 is also encased in a jacket 41. In this particular embodiment, the annulus 43 between the inner production fluid flowline 42 and the jacket 41 is filled with an insulation material 44, such as an open celled foam as is known in the art. The space 45 external to the jacket 41 and inside the external casing 40 can carry a supporting fluid, such as water, methanol, etc. or can be filled with a high pressure gas, which can further improve the insulative properties of the pipe-in-pipe flowline, for instance by providing access points 46 from the space 45 that carries the high pressure gas to the insulation material 44. The pipe-in-pipe arrangement can also include spacers 47 to maintain the desired distances between the production fluid flowline 42, the jacket 42, and the external casing 48. Other combination flowlines such as piggy-back flowlines are also encompassed herein.

Figure 8:
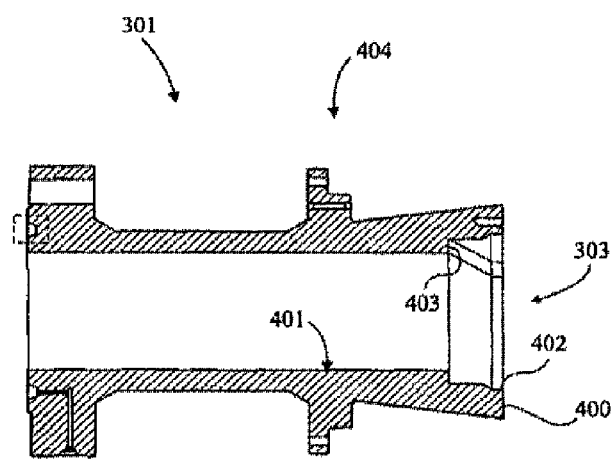
FIG. 8 illustrates a connector for a flowline system that may include the polyarylene sulfide composition as described herein.

Other components of the flowline system such as fittings, connectors, anchors, and so forth can also include the polyarylene sulfide composition. For example, an end fitting that receives the end of a flowline such as discussed above such that the flowline is both anchored and sealed with the end fitting can be formed of the polyarylene sulfide composition. By way of example, FIG. 8 illustrates an end fitting 301 for a flowline that can be formed of the polyarylene sulfide composition. The open mouth region 303 is formed by the open rim 400 of the end fitting. This rim defines a circular open mouth through which a flowline may be introduced. The inner surface 401 includes a first stepped region 402 provided to receive a barrier layer sealing ring when a flowline is located in the end fitting and a further stepped region 403 arranged to receive a further sealing ring for sealing ends of layers of the flowline. The remainder of the inner surface 401 can define a substantially smooth inner bore along which transportation fluid will flow during use. The end fitting 301 also can include a fastening region 404 extending outwardly from the waist of the body to which further parts of the fitting may be secured during process of terminating the a flowline in the end fitting.

Figure 9:
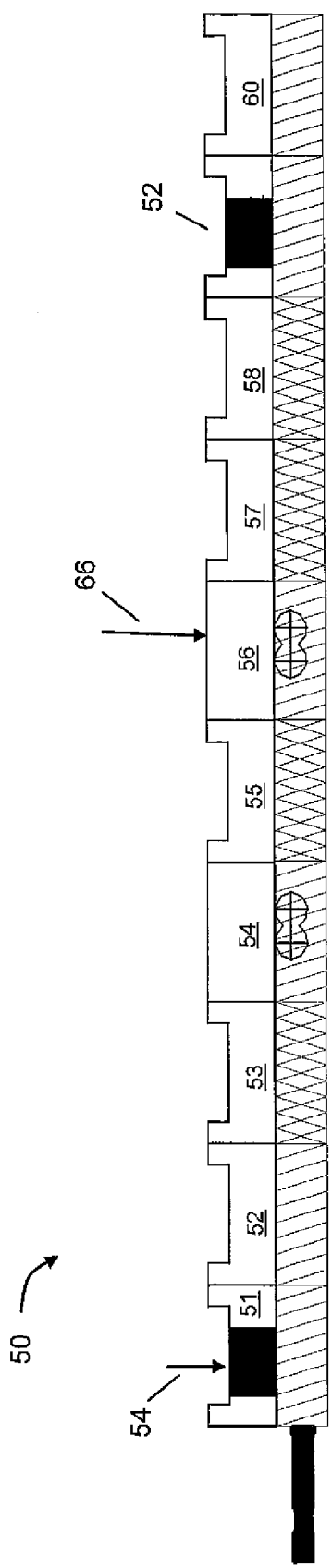
FIG. 9 is a schematic representation of a process for forming the polyarylene sulfide composition as disclosed herein.

According to one embodiment, a method for forming a flowline that includes the polyarylene sulfide composition can include formation of the polyarylene sulfide composition. FIG. 9 illustrates a schematic of a process that can be used in forming the polyarylene sulfide composition. As illustrated, the components of the polyarylene sulfide composition may be melt-kneaded in a melt processing unit such as an extruder 50. Extruder 50 can be any extruder as is known in the art including, without limitation, a single, twin, or multi-screw extruder, a co-rotating or counter rotating extruder, an intermeshing or non-intermeshing extruder, and so forth. In one embodiment, the composition may be melt processed in an extruder 50 that includes multiple zones or barrels. In the illustrated embodiment, extruder 50 includes ten barrels numbered 51-60 along the length of the extruder 50, as shown. Each barrel 51-60 can include feed lines 54, 66, vents 52, temperature controls, etc. that can be independently operated. A general purpose screw design can be used to melt process the polyarylene composition. By way of example, a polyarylene sulfide composition may be melt mixed using a twin screw extruder such as a Coperion co-rotating fully intermeshing twin screw extruder.

In forming a polyarylene sulfide composition, the polyarylene sulfide can be fed to the extruder 50 at a main feed throat 54. For instance, the polyarylene sulfide may be fed to the main feed throat 54 at the first barrel 51 by means of a metering feeder. The polyarylene sulfide can be melted and mixed with the other components of the composition as it progresses through the extruder 50. The impact modifier can be added to the composition in conjunction with the polyarylene sulfide composition at the main feed throat 54 or downstream of the main feed throat, as desired.

At a point downstream of the main feed throat 54, and following addition of the impact modifier to the composition, the crosslinking agent can be added to the composition. For instance, in the illustrated embodiment, a second feed line 56 at barrel 56 can be utilized for addition of the crosslinking agent. The point of addition for the crosslinking agent is not particularly limited. However, the crosslinking agent can be added to the composition at a point after the polyarylene sulfide has been mixed with the impact modifier under shear such that the impact modifier is well distributed throughout the polyarylene sulfide.

The polyarylene sulfide may be a polyarylene thioether containing repeat units of the formula (I):

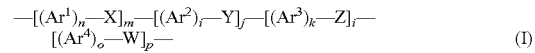

(I)

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from —$SO_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide typically includes more than about 30 mol %, more than about 50 mol %, or more than about 70 mol % arylene sulfide (—S—) units. In one embodiment the polyarylene sulfide includes at least 85 mol % sulfide linkages attached directly to two aromatic rings.

In one embodiment, the polyarylene sulfide is a polyphenylene sulfide, defined herein as containing the phenylene sulfide structure —$(C_6H_4$—$S)_n$— (wherein n is an integer of 1 or more) as a component thereof.

The polyarylene sulfide may be synthesized prior to forming the polyarylene sulfide composition, though this is not a requirement of a process, and a polyarylene sulfide can be purchased from known suppliers. For instance Fortron® polyphenylene sulfide available from Ticona of Florence, Ky., USA can be purchased and utilized as the polyarylene sulfide.

When employed, synthesis techniques that may be used in making a polyarylene sulfide are generally known in the art. By way of example, a process for producing a polyarylene sulfide can include reacting a material that provides a hydrosulfide ion, e.g., an alkali metal sulfide, with a dihaloaromatic compound in an organic amide solvent.

The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone.

The halogen atom can be fluorine, chlorine, bromine or iodine, and 2 halogen atoms in the same dihalo-aromatic compound may be the same or different from each other. In one embodiment, o-dichlorobenzene, m-dichlorobenzene, p-dichlorobenzene or a mixture of 2 or more compounds thereof is used as the dihalo-aromatic compound.

As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide may be a homopolymer or may be a copolymer. By a suitable, selective combination of dihaloaromatic compounds, a polyarylene sulfide copolymer can be formed containing not less than two different units. For instance, in the case where p-dichlorobenzene is used in combination with m-dichlorobenzene or 4,4'-dichlorodiphenylsulfone, a polyarylene sulfide copolymer can be formed containing segments having the structure of formula (II):

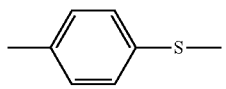
(II)

and segments having the structure of formula (III):

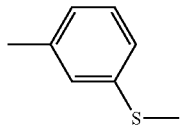
(III)

or segments having the structure of formula (IV):

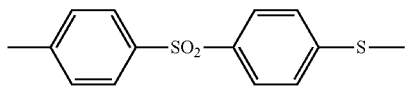
(IV)

In general, the amount of the dihaloaromatic compound(s) per mole of the effective amount of the charged alkali metal sulfide can generally be from 1.0 to 2.0 moles, from 1.05 to 2.0 moles, or from 1.1 to 1.7 moles. Thus, the polyarylene sulfide can include alkyl halide (generally alkyl chloride) end groups.

A process for producing the polyarylene sulfide can include carrying out the polymerization reaction in an organic amide solvent. Exemplary organic amide solvents used in a polymerization reaction can include, without limitation, N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof.

The amount of the organic amide solvent used in the reaction can be, e.g., from 0.2 to 5 kilograms per mole (kg/mol) of the effective amount of the alkali metal sulfide.

The polymerization can be carried out by a step-wise polymerization process. The first polymerization step can include introducing the dihaloaromatic compound to a reactor, and subjecting the dihaloaromatic compound to a polymerization reaction in the presence of water at a temperature of from about 180° C. to about 235° C., or from about 200° C. to about 230° C., and continuing polymerization until the conversion rate of the dihaloaromatic compound attains to not less than about 50 mol % of the theoretically necessary amount.

In a second polymerization step, water is added to the reaction slurry so that the total amount of water in the polymerization system is increased to about 7 moles, or to about 5 moles, per mole of the effective amount of the charged alkali metal sulfide. Following, the reaction mixture of the polymerization system can be heated to a temperature of from about 250° C. to about 290° C., from about 255° C. to about 280° C., or from about 260° C. to about 270° C. and the polymerization can continue until the melt viscosity of the thus formed polymer is raised to the desired final level of the polyarylene sulfide. The duration of the second polymerization step can be, e.g., from about 0.5 to about 20 hours, or from about 1 to about 10 hours.

The polyarylene sulfide may be linear, semi-linear, branched or crosslinked. A linear polyarylene sulfide includes as the main constituting unit the repeating unit of —(Ar—S)—. In general, a linear polyarylene sulfide may include about 80 mol % or more of this repeating unit. A linear polyarylene sulfide may include a small amount of a branching unit or a cross-linking unit, but the amount of branching or cross-linking units may be less than about 1 mol % of the total monomer units of the polyarylene sulfide. A linear polyarylene sulfide polymer may be a random copolymer or a block copolymer containing the above-mentioned repeating unit.

A semi-linear polyarylene sulfide may be utilized that may have a cross-linking structure or a branched structure provided by introducing into the polymer a small amount of one or more monomers having three or more reactive functional groups. For instance between about 1 mol % and about 10 mol % of the polymer may be formed from monomers having three or more reactive functional groups. Methods that may be used in making semi-linear polyarylene sulfide are generally known in the art. By way of example, monomer components used in forming a semi-linear polyarylene sulfide can include an amount of polyhaloaromatic compounds having 2 or more halogen substituents per molecule which can be utilized in preparing branched polymers. Such monomers can be represented by the formula R'X$_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'- tetramethylbiphenyl, 1,2,3,4-tetrachloronaphthalene, 1,2,4-tribromo-6-methylnaphthalene, and the like, and mixtures thereof.

Following polymerization, the polyarylene sulfide may be washed with liquid media. For instance, the polyarylene sulfide may be washed with water and/or organic solvents that will not decompose the polyarylene sulfide including, without limitation, acetone, N-methyl-2-pyrrolidone, a salt solution, and/or an acidic media such as acetic acid or hydrochloric acid prior to combination with other components while forming the mixture. The polyarylene sulfide can be washed in a sequential manner that is generally known to persons skilled in the art. Washing with an acidic solution or a salt solution may reduce the sodium, lithium or calcium metal ion end group concentration from about 2000 ppm to about 100 ppm.

A polyarylene sulfide can be subjected to a hot water washing process. The temperature of a hot water wash can be at or above about 100° C., for instance higher than about 120° C., higher than about 150° C., or higher than about 170° C.

The polymerization reaction apparatus for forming the polyarylene sulfide is not especially limited, although it is typically desired to employ an apparatus that is commonly used in formation of high viscosity fluids. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. Further examples of such a reaction apparatus include a mixing apparatus commonly used in kneading, such as a kneader, a roll mill, a Banbury mixer, etc. Following polymerization, the molten polyarylene sulfide may be discharged from the reactor, typically through an extrusion orifice fitted with a die of desired configuration, cooled, and collected. Commonly, the polyarylene sulfide may be discharged through a perforated die to form strands that are taken up in a water bath, pelletized and dried. The polyarylene sulfide may also be in the form of a strand, granule, or powder.

The polyarylene sulfide composition may include the polyarylene sulfide component (which also encompasses a blend of polyarylene sulfides) in an amount from about 10 wt. % to about 99 wt. % by weight of the composition, for instance from about 20% wt. % to about 90 wt. % by weight of the composition.

The polyarylene sulfide may be of any suitable molecular weight and melt viscosity, generally depending upon the final application intended for the polyarylene sulfide composition. For instance, the melt viscosity of the polyarylene sulfide may be a low viscosity polyarylene sulfide, having a melt viscosity of less than about 500 poise, a medium viscosity polyarylene sulfide, having a melt viscosity of between about 500 poise and about 1500 poise, or a high melt viscosity polyarylene sulfide, having a melt viscosity of greater than about 1,500 poise, as determined in accordance with ISO Test No. 11443 at a shear rate of 1200 s$^{-1}$ and at a temperature of 310° C.

According to one embodiment, the polyarylene sulfide can be functionalized to further encourage bond formation between the polyarylene sulfide and the impact modifier. For instance, a polyarylene sulfide can be further treated following formation with a carboxyl, acid anhydride, amine, isocyanate or other functional group-containing modifying compound to provide a functional terminal group on the polyarylene sulfide. By way of example, a polyarylene sulfide can be reacted with a modifying compound containing a mercapto group or a disulfide group and also containing a reactive functional group. In one embodiment, the polyarylene sulfide can be reacted with the modifying compound in an organic solvent. In another embodiment, the polyarylene sulfide can be reacted with the modifying compound in the molten state.

In one embodiment, a disulfide compound containing the desired functional group can be incorporated into the polyarylene sulfide composition formation process, and the polyarylene sulfide can be functionalized in conjunction with formation of the composition. For instance, a disulfide compound containing the desired reactive functional groups can be added to the melt extruder in conjunction with the polyarylene sulfide or at any other point prior to or in conjunction with the addition of the crosslinking agent.

Reaction between the polyarylene sulfide polymer and the reactively functionalized disulfide compound can include chain scission of the polyarylene sulfide polymer that can decrease melt viscosity of the polyarylene sulfide. In one embodiment, a higher melt viscosity polyarylene sulfide having low halogen content can be utilized as a starting polymer. Following reactive functionalization of the polyarylene sulfide polymer by use of a functional disulfide compound, a relatively low melt viscosity polyarylene sulfide with low halogen content can be formed. Following this chain scission, the melt viscosity of the polyarylene sulfide can be suitable for further processing, and the overall halogen content of the low melt viscosity polyarylene sulfide can be quite low. A polyarylene sulfide composition that exhibits excellent strength and degradation resistance in addition to low halogen content can be advantageous as low halogen content polymeric materials are becoming increasingly desired due to environmental concerns. In one embodiment, the polyarylene sulfide composition can have a halogen content of less than about 1000 ppm, less than about 900 ppm, less than about 600 ppm, or less than about 400 ppm as determined according to an elemental analysis using Parr Bomb combustion followed by Ion Chromatography.

The disulfide compound can generally have the structure of:

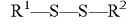

$$R^1\text{—}S\text{—}S\text{—}R^2$$

wherein $R^1$ and $R^2$ may be the same or different and are hydrocarbon groups that independently include from 1 to about 20 carbons. For instance, $R^1$ and $R^2$ may be an alkyl, cycloalkyl, aryl, or heterocyclic group. $R^1$ and $R^1$ may include reactive functionality at terminal end(s) of the disulfide compound. For example, at least one of $R^1$ and $R^2$ may include a terminal carboxyl group, hydroxyl group, a substituted or non-substituted amino group, a nitro group, or the like. In general, the reactive functionality can be selected such that the reactively functionalized polyarylene sulfide can react with the impact modifier. For example, when considering an epoxy-terminated impact modifier, the disulfide compound can include carboxyl and/or amine functionality.

Examples of disulfide compounds including reactive terminal groups as may be encompassed herein may include, without limitation, 2,2'-diaminodiphenyl disulfide, 3,3'-diaminodiphenyl disulfide, 4,4'-diaminodiphenyl disulfide, dibenzyl disulfide, dithiosalicyclic acid, dithioglycolic acid, α,α'-dithiodilactic acid, β,β'-dithiodilactic acid, 3,3'-dithiodipyridine, 4,4'dithiomorpholine, 2,2'-dithiobis(benzothiazole), 2,2'-dithiobis(benzimidazole), 2,2'-dithiobis(benzoxazole) and 2-(4'-morpholinodithio)benzothiazole.

The ratio of the amount of the polyarylene sulfide to the amount of the disulfide compound can be from about 1000:1 to about 10:1, from about 500:1 to about 20:1, or from about 400:1 to about 30:1.

In addition to the polyarylene sulfide polymer, the composition also includes an impact modifier. More specifically, the impact modifier can be an olefinic copolymer or terpolymer. For instance, the impact modifier can include ethylenically unsaturated monomer units have from about 4 to about 10 carbon atoms.

The impact modifier can be modified to include functionalization so as to react with the crosslinking agent. For instance, the impact modifier can be modified with a mole fraction of from about 0.01 to about 0.5 of one or more of the following: an α, β unsaturated dicarboxylic acid or salt thereof having from about 3 to about 8 carbon atoms; an α, β unsaturated carboxylic acid or salt thereof having from about 3 to about 8 carbon atoms; an anhydride or salt thereof having from about 3 to about 8 carbon atoms; a monoester or salt thereof having from about 3 to about 8 carbon atoms; a sulphonic acid or a salt thereof; an unsaturated epoxy compound having from about 4 to about 11 carbon atoms. Examples of such modification functionalities include maleic anhydride, fumaric acid, maleic acid, methacrylic acid, acrylic acid, and glycidyl methacrylate. Examples of metallic acid salts include the alkaline metal and transitional metal salts such as sodium, zinc, and aluminum salts.

A non-limiting listing of impact modifiers that may be used include ethylene-acrylic acid copolymer, ethylene-maleic anhydride copolymers, ethylene-alkyl(meth)acrylate-maleic anhydride terpolymers, ethylene-alkyl(meth)acrylate-glycidyl(meth)acrylate terpolymers, ethylene-acrylic ester-methacrylic acid terpolymer, ethylene-acrylic ester-maleic anhydride terpolymer, ethylene-methacrylic acid-methacrylic acid alkaline metal salt (ionomer) terpolymers, and the like. In one embodiment, for instance, an impact modifier can include a random terpolymer of ethylene, methylacrylate, and glycidyl methacrylate. The terpolymer can have a glycidyl methacrylate content of from about 5% to about 20%, such as from about 6% to about 10%. The terpolymer may have a methylacrylate content of from about 20% to about 30%, such as about 24%.

According to one embodiment, the impact modifier may be a linear or branched, homopolymer or copolymer (e.g., random, graft, block, etc.) containing epoxy functionalization, e.g., terminal epoxy groups, skeletal oxirane units, and/or pendent epoxy groups. For instance, the impact modifier may be a copolymer including at least one monomer component that includes epoxy functionalization. The monomer units of the impact modifier may vary. In one embodiment, for example, the impact modifier can include epoxy-functional methacrylic monomer units. As used herein, the term methacrylic generally refers to both acrylic and methacrylic monomers, as well as salts and esters thereof, e.g., acrylate and methacrylate monomers. Epoxy-functional methacrylic monomers as may be incorporated in the impact modifier may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

Other monomer units may additionally or alternatively be a component of the impact modifier. Examples of other monomers may include, for example, ester monomers, olefin monomers, amide monomers, etc. In one embodiment, the impact modifier can include at least one linear or branched α-olefin monomer, such as those having from 2 to 20 carbon atoms, or from 2 to 8 carbon atoms. Specific examples include ethylene; propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene.

Monomers included in an impact modifier that includes epoxy functionalization can include monomers that do not include epoxy functionalization, as long as at least a portion of the monomer units of the polymer are epoxy functionalized.

In one embodiment, the impact modifier can be a terpolymer that includes epoxy functionalization. For instance, the impact modifier can include a methacrylic component that includes epoxy functionalization, an α-olefin component, and a methacrylic component that does not include epoxy functionalization. For example, the impact modifier may be poly(ethylene-co-methylacrylate-co-glycidyl methacrylate), which has the following structure:

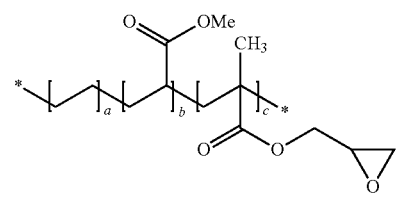

wherein, a, b, and c are 1 or greater.

In another embodiment the impact modifier can be a random copolymer of ethylene, ethyl acrylate and maleic anhydride having the following structure:

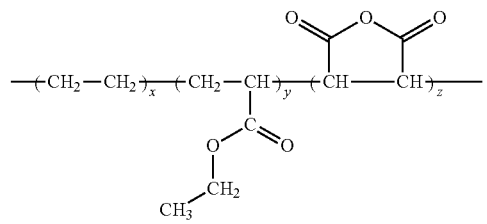

wherein x, y and z are 1 or greater.

The relative proportion of the various monomer components of a copolymeric impact modifier is not particularly limited. For instance, in one embodiment, the epoxy-functional methacrylic monomer components can form from about 1 wt. % to about 25 wt. %, or from about 2 wt. % to about 20 wt. % of a copolymeric impact modifier. An α-olefin monomer can form from about 55 wt. % to about 95 wt. %, or from about 60 wt. % to about 90 wt. %, of a copolymeric impact modifier. When employed, other monomeric components (e.g., a non-epoxy functional methacrylic monomers) may constitute from about 5 wt. % to about 35 wt. %, or from about 8 wt. % to about 30 wt. %, of a copolymeric impact modifier.

An impact modifier may be formed according to standard polymerization methods as are generally known in the art. For example, a monomer containing polar functional groups may be grafted onto a polymer backbone to form a graft copolymer. Alternatively, a monomer containing functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

Alternatively, an impact modifier may be obtained on the retail market. By way of example, suitable compounds for use as an impact modifier may be obtained from Arkema under the name Lotader®.

The molecular weight of the impact modifier can vary widely. For example, the impact modifier can have a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7.

In general, the impact modifier may be present in the composition in an amount from about 0.05% to about 40% by weight, from about 0.05% to about 37% by weight, or from about 0.1% to about 35% by weight.

Referring again to FIG. 8, the impact modifier can be added to the composition in conjunction with the polyarylene sulfide composition at the main feed throat 54 of the melt processing unit. This is not a requirement of the composition formation process, however, and in other embodiments, the impact modifier can be added downstream of the main feed throat. For instance, the impact modifier may be added at a location downstream from the point at which the polyarylene sulfide is supplied to the melt processing unit, but yet prior to the melting section, i.e., that length of the melt processing unit in which the polyarylene sulfide becomes molten. In another embodiment, the impact modifier may be added at a location downstream from the point at which the polyarylene sulfide becomes molten.

If desired, one or more distributive and/or dispersive mixing elements may be employed within the mixing section of the melt processing unit. Suitable distributive mixers for single screw extruders may include but are not limited to, for instance, Saxon, Dulmage, Cavity Transfer mixers, etc. Likewise, suitable dispersive mixers may include but are not limited to Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin mixers.

In addition to the polyarylene sulfide and the impact modifier, the polyarylene composition can include a crosslinking agent. The crosslinking agent can be a polyfunctional compound or combination thereof that can react with functionality of the impact modifier to form crosslinks within and among the polymer chains of the impact modifier. In general, the crosslinking agent can be a non-polymeric compound, i.e., a molecular compound that includes two or more reactively functional terminal moieties linked by a bond or a non-polymeric (non-repeating) linking component. By way of example, the crosslinking agent can include but is not limited to di-epoxides, poly-functional epoxides, diisocyanates, polyisocyanates, polyhydric alcohols, water-soluble carbodiimides, diamines, diaminoalkanes, polyfunctional carboxylic acids, diacid halides, and so forth. For instance, when considering an epoxy-functional impact modifier, a non-polymeric polyfunctional carboxylic acid or amine can be utilized as a crosslinking agent.

Specific examples of polyfunctional carboxylic acid crosslinking agents can include, without limitation, isophthalic acid, terephthalic acid, phthalic acid, 1,2-di(p-carboxyphenyl)ethane, 4,4'-dicarboxydiphenyl ether, 4,4'-bisbenzoic acid, 1,4- or 1,5-naphthalene dicarboxylic acids, decahydronaphthalene dicarboxylic acids, norbornene dicarboxylic acids, bicyclooctane dicarboxylic acids, 1,4-cyclohexanedicarboxylic acid (both cis and trans), 1,4-hexylenedicarboxylic acid, adipic acid, azelaic acid, dicarboxyl dodecanoic acid, succinic acid, maleic acid, glutaric acid, suberic acid, azelaic acid and sebacic acid. The corresponding dicarboxylic acid derivatives, such as carboxylic acid diesters having from 1 to 4 carbon atoms in the alcohol radical, carboxylic acid anhydrides or carboxylic acid halides may also be utilized.

Exemplary diols useful as crosslinking agents can include, without limitation, aliphatic diols such as ethylene glycol, 1,2-propylene glycol, 1,3-propylene glycol, 2,2-di-methyl-1,3-propane diol, 2-ethyl-2-methyl-1,3-propane diol, 1,4-butane diol, 1,4-but-2-ene diol, 1,3-1,5-pentane diol, 1,5-pentane diol, dipropylene glycol, 2-methyl-1,5-pentane diol, and the like. Aromatic diols can also be utilized such as, without limitation, hydroquinone, catechol, resorcinol, methylhydroquinone, chlorohydroquinone, bisphenol A, tetrachlorobisphenol A, phenolphthalein, and the like. Exemplary cycloaliphatic diols as may be used include a cycloaliphatic moiety, for example 1,6-hexane diol, dimethanol decalin, dimethanol bicyclooctane, 1,4-cyclohexane dimethanol (including its cis- and trans-isomers), triethylene glycol, 1,10-decanediol, and the like.

Exemplary diamines that may be utilized as crosslinking agents can include, without limitation, isophorone-diamine, ethylenediamine, 1,2-, 1,3-propylene-diamine, N-methyl-1,3-propylene-diamine, N,N'-dimethyl-ethylenediamine, and aromatic diamines, such as, for example, 2,4- and 2,6-toluoylene-diamine, 3,5-diethyl-2,4- and/or -2,6-toluoylene-diamine, and primary ortho- di-, tri- and/or tetra-alkyl-substituted 4,4'-diaminodiphenyl-methanes, (cyclo)aliphatic diamines, such as, for example, isophorone-diamine, ethylenediamine, 1,2-, 1,3-propylene-diamine, N-methyl-1,3-propylene-diamine, N,N'-dimethyl-ethylenediamine, and aromatic diamines, such as, for example, 2,4- and 2,6-toluoylene-diamine, 3,5-diethyl-2,4- and/or -2,6-toluoylene-diamine, and primary ortho- di-, tri- and/or tetra-alkyl-substituted 4,4'-diaminodiphenyl-methanes.

In one embodiment, the composition can include a disulfide-free crosslinking agent. For example, the crosslinking agent can include carboxyl and/or amine functionality with no disulfide group. A crosslinking agent that is disulfide-free can be utilized so as to avoid excessive chain scission of the polyarylene sulfide by the crosslinking agent during formation of the composition. It should be understood, however, that the utilization of a disulfide-free crosslinking agent does not in any way limit the utilization of a reactively functionalized disulfide compound for functionalizing the polyarylene sulfide. For instance, in one embodiment, the composition can be formed according to a process that includes addition of a reactively functionalized disulfide compound to the melt processing unit that can reactively functionalize the polyarylene sulfide. The crosslinking agent utilized in this embodiment can then be a disulfide-free crosslinking agent that can include functionality that is reactive with the impact modifier as well as with the reactively functionalized polyarylene sulfide. Thus, the composition can be highly crosslinked without excessive scission of the polyarylene sulfide polymer chains.

In another embodiment the crosslinking agent and the polyarylene sulfide functionalization compound (when present) can be selected so as to encourage chain scission of the polyarylene sulfide. This may be beneficial, for instance, which chain scission is desired to decrease the melt viscosity of the polyarylene sulfide polymer.

The polyarylene sulfide composition may generally include the crosslinking agent in an amount from about 0.05 wt. % to about 2 wt. % by weight of the polyarylene sulfide composition, from about 0.07 wt. % to about 1.5 wt. % by weight of the polyarylene sulfide composition, or from about 0.1 wt. % to about 1.3 wt. %.

The crosslinking agent can be added to the melt processing unit following mixing of the polyarylene sulfide and the impact modifier. For instance, as illustrated in FIG. 9, the crosslinking agent can be added to the composition at a downstream location 66 following addition of polyarylene sulfide and the impact modifier (either together or separately) to the melt processing unit. This can ensure that the impact modifier has become dispersed throughout the polyarylene sulfide prior to addition of the crosslinking agent.

To help encourage distribution of the impact modifier throughout the melt prior to addition of the crosslinking agent, a variety of different parameters may be selectively controlled. For example, the ratio of the length ("L") to diameter ("D") of a screw of the melt processing unit may be selected to achieve an optimum balance between throughput and impact modifier distribution. For example, the L/D value after the point at which the impact modifier is supplied may be controlled to encourage distribution of the impact modifier. More particularly, the screw has a blending length ("$L_B$") that is defined from the point at which both the impact modifier and the polyarylene sulfide are supplied to the unit (i.e., either where they are both supplied in conjunction with one another or the point at which the latter of the two is supplied) to the point at which the crosslinking agent is supplied, the blending length generally being less than the total length of the screw. For example, when considering a melt processing unit that has an overall L/D of 40, the $L_B$/D ratio of the screw can be from about 1 to about 36, in some embodiments from about 4 to about 20, and in some embodiments, from about 5 to about 15. In one embodiment, the L/$L_B$ ratio can be from about 40 to about 1.1, from about 20 to about 2, or from about 10 to about 5.

Following addition of the crosslinking agent, the composition can be mixed to distribute the crosslinking agent throughout the composition and encourage reaction between the crosslinking agent, the impact modifier, and, in one embodiment, with the polyarylene sulfide.

The composition can also include one or more additives as are generally known in the art. For example, one or more fillers can be included in the polyarylene sulfide composition. One or more fillers may generally be included in the polyarylene sulfide composition an amount of from about 5 wt. % to about 70 wt. %, or from about 20 wt. % to about 65 wt. % by weight of the polyarylene sulfide composition.

The filler can be added to the polyarylene sulfide composition according to standard practice. For instance, the filler can be added to the composition at a downstream location of the melt processing unit. For example, a filler may be added to the composition in conjunction with the addition of the crosslinking agent. However, this is not a requirement of a formation process and the filler can be added separately from the crosslinking agent and either upstream or downstream of the point of addition of the crosslinking agent. In addition, a filler can be added at a single feed location, or may be split and added at multiple feed locations along the melt processing unit.

In one embodiment, a fibrous filler can be included in the polyarylene sulfide composition. The fibrous filler may include one or more fiber types including, without limitation, polymer fibers, glass fibers, carbon fibers, metal fibers, basalt fibers, and so forth, or a combination of fiber types. In one embodiment, the fibers may be chopped fibers, continuous fibers, or fiber rovings (tows).

Fiber sizes can vary as is known in the art. In one embodiment, the fibers can have an initial length of from about 3 mm to about 5 mm. In another embodiment, for instance when considering a pultrusion process, the fibers can be continuous fibers. Fiber diameters can vary depending upon the particular fiber used. The fibers, for instance, can have a diameter of less than about 100 μm, such as less than about 50 μm. For instance, the fibers can be chopped or continuous fibers and can have a fiber diameter of from about 5 μm to about 50 μm, such as from about 5 μm to about 15 μm.

The fibers may be pretreated with a sizing as is generally known. In one embodiment, the fibers may have a high yield or small K numbers. The tow is indicated by the yield or K number. For instance, glass fiber tows may have 50 yield and up, for instance from about 115 yield to about 1200 yield.

Other fillers can alternatively be utilized or may be utilized in conjunction with a fibrous filler. For instance, a particulate filler can be incorporated in the polyarylene sulfide composition. In general, particulate fillers can encompass any particulate material having a median particle size of less than about 750 μm, for instance less than about 500 μm, or less than about 100 μm. In one embodiment, a particulate filler can have a median particle size in the range of from about 3 μm to about 20 μm. In addition, a particulate filler can be solid or hollow, as is known. Particulate fillers can also include a surface treatment, as is known in the art.

Particulate fillers can encompass one or more mineral fillers. For instance, the polyarylene sulfide composition can include one or more mineral fillers in an amount of from about 1 wt. % to about 60 wt. % of the composition. Mineral fillers may include, without limitation, silica, quartz powder, silicates such as calcium silicate, aluminum silicate, kaolin, talc, mica, clay, diatomaceous earth, wollastonite, calcium carbonate, and so forth.

A filler can be an electrically conductive filler such as, without limitation, carbon black, graphite, graphene, carbon fiber, carbon nanotubes, a metal powder, and so forth. In those embodiments in which the polyarylene sulfide composition includes electrically conductive fillers, for instance when the polyarylene sulfide composition is utilized in forming a flow line, adequate electrically conductive filler can be included such that the composition has a volume specific resistance of equal to or less than about $10^9$ ohms cm.

When incorporating multiple fillers, for instance a particulate filler and a fibrous filler, the fillers may be added together or separately to the melt processing unit. For instance, a particulate filler can be added to the main feed with the polyarylene sulfide or downstream prior to addition of a fibrous filler, and a fibrous filler can be added further downstream of the addition point of the particulate filler. In general, a fibrous filler can be added downstream of any other fillers such as a particulate filler, though this is not a requirement.

In one embodiment, the polyarylene sulfide composition can include a UV stabilizer as an additive. For instance, the polyarylene sulfide composition can include a UV stabilizer in an amount of between about 0.5 wt. % and about 15 wt. %, between about 1 wt. % and about 8 wt. %, or between about 1.5 wt. % and about 7 wt. % of a UV stabilizer. One particularly suitable UV stabilizer that may be employed is a hindered amine UV stabilizer. Suitable hindered amine UV stabilizer compounds may be derived from a substituted piperidine, such as alkyl-substituted piperidyl, piperidinyl, piperazinone, alkoxypiperidinyl compounds, and so forth. For example, the hindered amine may be derived from a 2,2,6,6-tetraalkylpiperidinyl. The hindered amine may, for example, be an oligomeric or polymeric compound having a number average molecular weight of about 1,000 or more, in some embodiments from about 1000 to about 20,000, in some embodiments from about 1500 to about 15,000, and in some embodiments, from about 2000 to about 5000. Such compounds typically contain at least one 2,2,6,6-tetraalkylpiperidinyl group (e.g., 1 to 4) per polymer repeating unit. One particularly suitable high molecular weight hindered amine is commercially available from Clariant under the designation Hostavin® N30 (number average molecular weight of 1200). Another suitable high molecular weight hindered amine is commercially available from Adeka Palmarole SAS under the designation ADK STAB® LA-63 and ADK STAB® LA-68.

In addition to the high molecular hindered amines, low molecular weight hindered amines may also be employed. Such hindered amines are generally monomeric in nature and have a molecular weight of about 1000 or less, in some embodiments from about 155 to about 800, and in some embodiments, from about 300 to about 800.

Other suitable UV stabilizers may include UV absorbers, such as benzotriazoles or benzopheones, which can absorb UV radiation.

An additive that may be included in a polyarylene sulfide composition is one or more colorants as are generally known in the art. For instance, the polyarylene sulfide composition can include from about 0.1 wt. % to about 10 wt. %, or from about 0.2 wt. % to about 5 wt. % of one or more colorants. As utilized herein, the term "colorant" generally refers to any substance that can impart color to a material. Thus, the term "colorant" encompasses both dyes, which exhibit solubility in an aqueous solution, and pigments, that exhibit little or no solubility in an aqueous solution.

Examples of dyes that may be used include, but are not limited to, disperse dyes. Suitable disperse dyes may include those described in "Disperse Dyes" in the Color Index, $3^{rd}$ edition. Such dyes include, for example, carboxylic acid group-free and/or sulfonic acid group-free nitro, amino, aminoketone, ketoninime, methine, polymethine, diphenylamine, quinoline, benzimidazole, xanthene, oxazine and coumarin dyes, anthraquinone and azo dyes, such as mono- or di-azo dyes. Disperse dyes also include primary red color disperse dyes, primary blue color disperse dyes, and primary yellow color dyes Pigments that can be incorporated in a polyarylene sulfide composition can include, without limitation, organic pigments, inorganic pigments, metallic pigments, phosphorescent pigments, fluorescent pigments, photochromic pigments, thermochromic pigments, iridescent pigments, and pearlescent pigments. The specific amount of pigment can depends upon the desired final color of the product. Pastel colors are generally achieved with the addition of titanium dioxide white or a similar white pigment to a colored pigment.

Other additives that can be included in the polyarylene sulfide composition can encompass, without limitation, antimicrobials, lubricants, pigments or other colorants, impact modifiers, antioxidants, other stabilizers (e.g., heat stabilizers including organophosphites such as Doverphos® products available from Dover Chemical Corporation), surfactants, flow promoters, solid solvents, and other materials added to enhance properties and processability. Such optional materials may be employed in the polyarylene sulfide composition in conventional amounts and according to conventional processing techniques, for instance through addition to the polyarylene sulfide composition at the main feed throat. Beneficially, the polyarylene sulfide composition can exhibit desirable characteristics without the addition of plasticizers. For instance, the composition can be free of plasticizers such as phthalate esters, trimellitates, sebacates, adipates, gluterates, azelates, maleates, benzoates, and so forth.

Following addition of all components to the polyarylene sulfide composition, the composition is thoroughly mixed in the remaining section(s) of the extruder and extruded through a die. The final extrudate can be pelletized or other wise shaped as desired, for instance the final extrudate can be in the form of a pultruded tape or ribbon that can be wrapped to form a layer of a flowline.

Conventional shaping processes can be used for forming a flowline that includes the polyarylene sulfide composition including, without limitation, extrusion, injection molding, blow-molding, thermoforming, and so forth.

For instance, according to one embodiment, a polyarylene sulfide layer can be extruded over the carcass of a multilayer flowline, e.g., a riser. According to another embodiment, a layer of a multilayer flowline can be formed from a continuous tape of the polyarylene sulfide composition, e.g., a fiber reinforced tape or ribbon formed according to a pultrusion formation method. A tape can be wrapped to form the layer of a multilayered flowline according to known practices as are generally known in the art.

In one embodiment, the carcass of a multilayer riser as illustrated in FIG. 3 can be formed according to a helical winding method as is generally known. Specifically, a metal (e.g., stainless steel) strip can be formed and helically wound and interlocked with adjacent windings as is known in the art to form a corrugated tube with a specified internal diameter. Following formation, the carcass can be taken up on a reel in preparation of formation of the barrier layer.

To form the barrier layer, the polyarylene sulfide is melt processed and passed through an extruder cross-head, wherein the melt is applied over the carcass. Control of extruder volume and line speed in conjunction with controlled die size is used to control the thickness of the barrier layer formed over the carcass.

Additional layers can be applied to the flowline according to standard practice. For instance a shaped carbon steel strip can be helically wound around the nascent flowline with adjacent winding interlocked with one another to form a hoop strength layer, and flat strips can be helically wound to forma additional strength layers.

A reinforced polymer tape, for instance a carbon fiber or glass fiber reinforced polyarylene sulfide tape formed according to a pultrusion method as is generally known can be utilized to form one or more anti-wear layers of a flowline. Tapes as may be applied can be those for use as manufacturing aids, anti-wear layers, insulation layers, and so forth. A polymer tape layer can also help to prevent birdcaging of the flowline during use. An external polymeric layer can be extruded over the multilayer flowline.

Of course, other formation methods as are generally known in the art may alternatively be utilized, depending upon the specific design of the flowline, cost considerations, particular materials to be utilized, etc. By way of example, a single layer flowline 10 as illustrated in FIG. 4 can formed according to a blow molding process. During blow molding, the polyarylene sulfide composition is first heated and extruded into a parison using a die attached to an extrusion device. When the parison is formed, the composition must have sufficient melt strength to prevent gravity from undesirably elongating portions of the parison and thereby forming non-uniform wall thicknesses and other imperfections. The parison is received into a molding device, generally formed of multiple sections that together form a three-dimensional mold cavity.

As can be appreciated, a certain period of time elapses from formation of the parison to moving the parison into engagement with the molding device. During this stage of the process, the melt strength of the polyarylene sulfide composition can be high enough such that the parison maintains its shape during movement. The polyarylene sulfide composition can also be capable of remaining in a semi-fluid state and not solidifying too rapidly before blow molding commences.

Once the molding device is closed, a gas, such as an inert gas is fed into the parison from a gas supply. The gas supplies sufficient pressure against the interior surface of the parison such that the parison conforms to the shape of the mold cavity. After blow molding, the finished shaped article is then removed. In one embodiment, cool air can be injected into the molded part for solidifying the polyarylene sulfide composition prior to removal from the molding device.

A continuous blow molding process may also be utilized in forming a flow line. According to a continuous blow molding process, a stationary extruder) can plasticize and force the molten polyarylene sulfide composition through a head to form a continuous parison. An accumulator can be used to support the parison and prevent sagging prior to molding. The parison may be fed to a mold formed of articulated sections that travel in conjunction with the continuous parison on a mold conveyor assembly. Air under pressure is applied to the parison to blow mold the composition within the mold. After the composition has been molded and sufficiently cooled within the mold as the mold and composition travel together, the mold segments are separated from one another and the formed section of the component (e.g., the pipe) is removed from the conveyor and taken up, as on a take-up reel.

If desired, the formed article can be further treated to include additional layers external to the polyarylene sulfide, so as to form a multi-layer flowline that includes the polyarylene sulfide composition as the innermost barrier layer.

A flowline or a layer of a flowline can be formed according to an extrusion process. For example, an extrusion process utilizing a simple or barrier type screw can be utilized and, in one embodiment, a mixing tip need not be utilized in the process. The compression ratio for an extrusion process can be between about 2.5:1 and about 4:1. For instance, the compression ratio can be about 25% feed, about 25% transition, and about 50% metering. The ratio of the barrel length to the barrel diameter (L/D) can be from about 16 to about 24. An extrusion process can also utilize other standard components as are known in the art such as, for example, breaker plates, screen packs, adapters, a die, and a vacuum tank. The vacuum tank can generally include a sizing sleeve/calibration ring, tank seals, and the like.

When forming flowline or a portion of a flowline according to an extrusion process, the polyarylene sulfide composition can first be dried, for instance at a temperature of from about 90° C. to about 100° C. for about three hours. It may be beneficial to avoid drying for an extensive length of time so as to avoid discoloration of the composition. The extruder can exhibit different temperatures in different zones, as is known. For instance, in one embodiment, the extruder can include at least four zones, with the temperature of the first zone from about 276° C. to about 288° C., the temperature of the second zone from about 282° C. to about 299° C., the temperature of the third zone from about 282° C. to about 299° C., and the temperature of the fourth zone from about 540° C. to about 580° C. Meanwhile, the temperature of the die can be from about 293° C. to about 310° C., and the vacuum tank water can be from about 20° C. to about 50° C.

Typically, the head pressure can be from about 100 pounds per square inch (psi) (about 690 kPa) to about 1000 psi (about 6900 kPa), and the head pressure can be adjusted to achieve a stable melt flow, as is known. For instance, the head pressure can be reduced by increasing the extruder zone temperature, by increasing the extruder screw rotations per minute, reducing the screen pack mesh size and/or the number of screens. In general, the line speed can be from about 4 meters per minute to about 15 meters per minute. Of course, the actual line speed can depend upon the final dimension of the tubular member, the aesthetics of the final product and process stability.

The die swell during an extrusion process can generally be negligible. A draw down of about 1.2 to about 1.7 can generally be utilized, as a higher draw down can negatively affect the final properties of the tubular member, depending on other processing conditions. Die drool can generally be avoided by drying the resin adequately prior to extrusion as well as by maintaining the melt temperature at less than about 304° C.

In one embodiment, a flowline or a layer of a flowline extruded from the polyarylene sulfide composition can have a wall thickness of between about 0.5 millimeters to about 5 millimeters, though tubular members having larger wall thickness can be formed from the composition as desired. The calibration ring inner diameter can decide the outer diameter of the tubular member and will generally be less than the outer diameter of the die, as is known. The inner diameter of the tubular member can be utilized to determine the desired outer diameter of the mandrel and the line speed, as is known.

Other formation processes such as injection molding may be utilized in forming a portion of a flowline or a component of a flowline system, for instance when forming a connector, termination, anchor, etc. of a flowline. An injection molding process can generally include heating the polyarylene sulfide composition in a preheating zone to a plastic melt, and thereafter forcing the composition through a nozzle into a closed mold. The temperature of the mold is generally substantially lower than the melt temperature, although the exact relationship between the melt temperature and the mold temperature is dependent on factors such as the desired surface characteristics of the product as will be appreciated by the skilled artisan. The injection molding may be carried out in conventional injection-molding apparatus having, for example, a preheating cylinder, plunger, or reciprocating screw, torpedo, nozzle and mold including a sprue, runners, gates and mold cavities. Actual molding temperatures and pressures will vary depending on the type of machine as is known, e.g., employment of a plunger injection molding machine or a screw injection molding machine or on the desired shape and size of the molded article. Cycle times are usually between about 30 and about 110 seconds.

Embodiments of the present disclosure are illustrated by the following examples that are merely for the purpose of illustration of embodiments and are not to be regarded as limiting the scope of the invention or the manner in which it may be practiced. Unless specifically indicated otherwise, parts and percentages are given by weight.

Formation and Test Methods

Injection Molding Process: Tensile bars are injection molded to ISO 527-1 specifications according to standard ISO conditions.

Melt Viscosity: All materials are dried for 1.5 hours at 150° C. under vacuum prior to testing. The melt viscosity is measured on a capillary rheometer at 316° C. and 400 sec$^{-1}$ with the viscosity measurement taken after five minutes of constant shear.

Tensile Properties: Tensile properties including tensile modulus, yield stress, yield strain, strength at break, elongation at yield, elongation at break, etc. are tested according to ISO Test No. 527 (technically equivalent to ASTM D638). Modulus, strain, and strength measurements are made on the same test strip sample having a length of 80 mm, thickness of 10 mm, and width of 4 mm. The testing temperature is 23° C., and the testing speeds are 5 or 50 mm/min.

Flexural Properties: Flexural properties including flexural strength and flexural modulus are tested according to ISO Test No. 178 (technically equivalent to ASTM D790). This test is performed on a 64 mm support span. Tests are run on the center portions of uncut ISO 3167 multi-purpose bars. The testing temperature is 23° C. and the testing speed is 2 mm/min.

Deflection Temperature Under Load ("DTUL"): The deflection under load temperature was determined in accordance with ISO Test No. 75-2 (technically equivalent to ASTM D648-07). More particularly, a test strip sample having a length of 80 mm, thickness of 10 mm, and width of 4 mm was subjected to an edgewise three-point bending test in which the specified load (maximum outer fibers stress) was 1.8 Megapascals. The specimen was lowered into a silicone oil bath where the temperature is raised at 2° C. per minute until it deflects 0.25 mm (0.32 mm for ISO Test No. 75-2).

Notched Charpy Impact Strength: Notched Charpy properties are tested according to ISO Test No. ISO 179-1) (technically equivalent to ASTM D256, Method B). This test is run using a Type A notch (0.25 mm base radius) and Type 1 specimen size (length of 80 mm, width of 10 mm, and thickness of 4 mm). Specimens are cut from the center of a multi-purpose bar using a single tooth milling machine. The testing temperature is 23° C., −30° F., or −40° F. as reported below.

Unnotched Charpy Impact Strength: Unnotched Charpy properties are tested according to ISO Test No. 180 (technically equivalent to ASTM D256). The test is run using a Type 1 specimen (length of 80 mm, width of 10 mm and thickness of 4 mm). Specimens are cut from the center of a multi-purpose bare using a single tooth milling machine. The testing temperature is 23° C.

Izod Notched Impact Strength: Notched Izod properties are tested according to ISO Test No. 180 (technically equivalent to ASTM D256, Method A). This test is run using a Type A notch. Specimens are cut from the center of a multi-purpose bar using a single tooth milling machine. The testing temperature is 23° C.

Density and Specific Gravity: Density was determined according to ISO Test No. 1183 (technically equivalent to ASTM D792). The specimen was weighed in air then weighed when immersed in distilled water at 23° C. using a sinker and wire to hold the specimen completely submerged as required.

Vicat softening temperature: Vicat Softening temperature was determined according to method A, with a load of 10 N and according to method B with a load of 50 N as described in ISO Test No. 306 (technically equivalent to ASTM D1525), both of which utilized a heating rate of 50 K/h.

Water absorption was determined according to ISO Test No. 62. The test specimens are immersed in distilled water at 23° C. until the water absorption essentially ceases (23° C./sat).

Complex viscosity: Complex viscosity is determined by a Low shear sweep (ARES) utilizing an ARES-G2 (TA Instruments) testing machine equipped with 25 mm SS parallel plates and using TRIOS software. A dynamic strain sweep was performed on a pellet sample prior to the frequency sweep, in order to find LVE regime and optimized testing condition. The strain sweep was done from 0.1% to 100%, at a frequency 6.28 rad/s. The dynamic frequency sweep for each sample was obtained from 500 to 0.1 rad/s, with strain amplitude of 3%. The gap distance was kept at 1.5 mm for pellet samples. The temperature was set at 310° C. for all samples.

Figure 10:
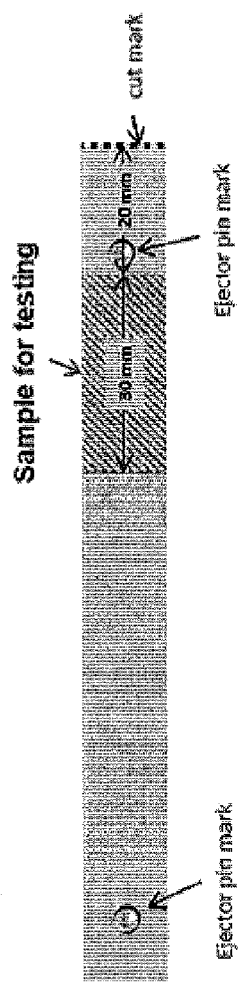
FIG. 10 illustrates the sample used in determination of melt strength and melt elongation of polyarylene sulfide compositions described herein.

Melt strength and melt elongation is performed on ARES-G2 equipped EVF fixture. The flame bar sample was cut as shown in FIG. 10. The same area of flame bar was used for each run, in order to keep the crystallinity of test sample same and thus to minimize the variation between replicates. A transient strain was applied to each sample at 0.2/s rate. At least triplicate run was done for each sample to obtain a representative curve.

Permeation Resistance: The fuel permeation studies were performed on samples according to SAE Testing Method No. J2665. For all samples, stainless-steel cups were used. Injection molded plaques with a diameter of 3 inches (7.6 centimeters) were utilized as test samples. The thickness of each sample was measured in 6 different areas. An O-ring Viton® fluoroelastomer was used as a lower gasket between cup flange and sample (Purchased from McMaster-Carr, cat#9464K57, A75). A flat Viton® fluoroelastomer (Purchased from McMaster-Carr, cat#86075K52, 1/16" thickness, A 75) was die-cut to 3 inch (7.6 cm) OD and 2.5 inch (6.35 cm) ID, and used as the upper gasket between the sample and the metal screen. The fuel, about 200 ml, was poured into the cup, the cup apparatus was assembled, and the lid was finger-tightened. This was incubated in a 40° C. oven for 1 hour, until the vapor pressure equilibrated and the lid was tightened to a torque 15 in-lb. The fuel loss was monitored gravimetrically, daily for the first 2 weeks followed by twice a week for the rest of the testing period. A blank run was done in the same manner with an aluminum disk (7.6 cm diameter, 1.5 mm thickness) and the result was subtracted from the samples. All samples were measured in duplicate. The normalized permeation rate was calculated following an equilibration period. The permeation rate for each sample was obtained from the slope of linear regression fitting of daily weight loss (gm/day). The normalized permeation rate was calculated by dividing the permeation rate by the effective permeation area and multiplying by average thickness of specimen. The average permeation rates are reported.

Hydrocarbon volume uptake: Absorption and diffusion testing was performed using the tab ends cut from supplied tensile bars. Each material was immersed in Brent crude oil, hydrocarbon/water mixture (and in a one-off test to hydrocarbon only). Rates and amounts of liquid absorbed were measured. The hydrocarbon liquid mixture had the following composition:

| Volume percent (%) | Composition |
|---|---|
| 10 | Distilled water |
| 60 | 70% heptane, 20% cyclohexane and 10% Toluene |
| balance | Nitrogen |

All exposure testing was conducted at 130° C. for a period of two weeks utilizing an air-circulating oven, air having been removed from the test vessel by purging with nitrogen; the test being conducted at vapor pressure.

Example 1

Materials utilized to form the compositions included the following:
Polyarylene sulfide: Fortron® 0214 linear polyphenylene sulfide available from Ticona Engineering Polymers of Florence, Ky.
Impact Modifier: LOTADER® AX8840—a random copolymer of ethylene and glycidyl methacrylate available from Arkema, Inc.
Crosslinking Agent: Terephthalic Acid
Disulfide: 2,2-dithiodibenzoic acid
Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the disulfide was fed using a gravimetric feeder at barrel 6. Materials were further mixed then extruded through a strand die. The strands were water-quenched in a bath to solidify and granulated in a pelletizer.

Compositions of the samples are provided in Table 1, below. Amounts are provided as weight percentages based upon the weight of the sample.

TABLE 1

| Component | Addition Point | Sample 1 | Sample 2 |
|---|---|---|---|
| Lubricant | main feed | 0.3 | 0.3 |
| Disulfide | barrel 6 | — | 1.0 |
| Impact Modifier | main feed | 25.0 | 25.0 |
| Polyarylene Sulfide | main feed | 74.7 | 73.7 |
| Total | | 100.0 | 100.0 |

Following formation, samples were tested for a variety of physical characteristics. Results are provided in Table 2, below.

TABLE 2

| | Sample 1 | Sample 2 |
|---|---|---|
| Melt Viscosity (poise) | 3328 | 4119 |
| Tensile Modulus (MPa) | 1826 | 1691 |
| Tensile Break Stress (MPa) | 43.73 | 44.98 |
| Tensile Break Strain (%) | 96.37 | 135.12 |
| Std. Dev. | 39.07 | 34.40 |
| Notched Charpy Impact Strength at 23° C. (kJ/m$^2$) | 61.03 | 53.00 |

Samples were annealed at 230° C. for 2 hours and re-tested for physical characteristics. Results are provided in Table 3, below.

TABLE 3

| | Sample 1 | Sample 2 |
|---|---|---|
| Tensile Modulus (MPa) | 1994.00 | 1725.00 |
| Tensile Break Stress (MPa) | 45.04 | 45.20 |
| Tensile Break Strain (%) | 58.01 | 73.76 |
| Std. Dev. | 6.60 | 4.78 |

As can be seen, Sample 2 exhibited better tensile elongation and lower modulus before and after annealing. However, no improvement in impact strength was seen, which is believed to be due to a chain scission reaction between the disulfide and the polypropylene sulfide.

Example 2

Materials as described in Example 1 were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. The disulfide was fed using a gravimetric feeder at various locations in the extruder; at the main feed throat, at barrel 4 and barrel 6. The crosslinking agent was fed at barrel 6. Materials were further mixed then extruded through a strand die. The strands were water-quenched in a bath to solidify and granulated in a pelletizer.

Comparative Samples 3 and 4 were formed of the same composition and compounded by use of a different screw design.

TABLE 4

| | Addition Point | 3 | 4 | 5 | 6 | 7 | 8 | 9 | 10 |
|---|---|---|---|---|---|---|---|---|---|
| Lubricant | main feed | 0.3 | 0.3 | 0.3 | 0.3 | 0.3 | 0.3 | 0.3 | 0.3 |
| Crosslinking Agent | barrel 6 | — | — | 0.5 | 1.0 | 1.0 | 0.5 | 0.5 | 0.5 |
| Disulfide | main feed | — | — | — | — | — | 0.30 | — | — |
| Disulfide | barrel 4 | — | — | — | — | — | — | 0.3 | — |
| Disulfide | barrel 6 | — | — | — | — | — | — | — | 0.3 |

TABLE 4-continued

| | Addition Point | 3 | 4 | 5 | 6 | 7 | 8 | 9 | 10 |
|---|---|---|---|---|---|---|---|---|---|
| Impact Modifier | main feed | 15.0 | 15.0 | 15.0 | 15.0 | 10.0 | 15.0 | 15.0 | 15.0 |
| Polyarylene Sulfide | main feed | 84.7 | 84.7 | 84.2 | 83.7 | 88.7 | 83.9 | 83.9 | 83.9 |
| Total | | 100.0 | 100.0 | 100.0 | 100.0 | 100.0 | 100.0 | 100.0 | 100.0 |

Following formation, tensile bars were formed and tested for a variety of physical characteristics. Results are provided in Table 5, below.

TABLE 5

| | Sample 3 | Sample 4 | Sample 5 | Sample 6 | Sample 7 | Sample 8 | Sample 9 | Sample 10 |
|---|---|---|---|---|---|---|---|---|
| Melt Viscosity (poise) | 2423 | — | 2659 | 2749 | 2067 | 2349 | 2310 | 2763 |
| Density (g/cm$^3$) | — | 1.28 | — | 1.25 | — | — | — | — |
| Tensile Modulus (MPa) | 2076 | 2800 | 2177 | 2207 | 2551 | 1845 | 2185 | 2309 |
| Tensile Break Stress (MPa) | 46.13 | — | 45.40 | 48.27 | 51.71 | 46.47 | 47.16 | 47.65 |
| Tensile Break Strain (%) | 33.68 | 25 | 43.97 | 35.94 | 26.90 | 47.51 | 40.85 | 63.85 |
| Elongation at Yield (%) | 5.17 | 5 | 5.59 | 7.49 | 4.5 | 11.78 | 6.94 | 7.00 |
| Yield Stress (MPa) | 51.07 | 52 | 50.76 | 51.62 | 59.63 | 51.07 | 52.56 | 51.88 |
| Notched Charpy Impact Strength at 23° C. (kJ/m$^2$) | 22.30 | 30 | 23.90 | 39.40 | 14.80 | 12.50 | 19.70 | 39.90 |
| Notched Charpy Impact Strength at −30° C. (kJ/m$^2$) | 7.8 | 7 | — | 10 | — | — | — | 10.8 |
| DTUL (° C.) | — | 100 | — | 102 | — | — | — | — |
| Melt Temp. (° C.) | 280 | 280 | 280 | 280 | 280 | 280 | 280 | 280 |
| Water absorption (%) | — | 0.05 | — | 0.05 | — | — | — | — |
| Hydrocarbon volume uptake (%) | 16 | | | | | | | |

Samples were annealed at 230° C. for 2 hours and re-tested for physical characteristics. Results are provided in Table 6, below.

TABLE 6

| | Sample 3 | Sample 4 | Sample 5 | Sample 6 | Sample 7 | Sample 8 | Sample 9 | Sample 10 |
|---|---|---|---|---|---|---|---|---|
| Tensile Modulus (MPa) | 2383 | — | 2339 | 2279 | 2708 | 2326 | 2382 | 2491 |
| Tensile Break Stress (MPa) | 52.70 | — | 53.96 | 53.11 | 61.10 | 56.74 | 54.81 | 55.25 |

TABLE 6-continued

|  | Sample 3 | Sample 4 | Sample 5 | Sample 6 | Sample 7 | Sample 8 | Sample 9 | Sample 10 |
|---|---|---|---|---|---|---|---|---|
| Tensile Break Strain (%) | 29.42 | — | 20.97 | 35.76 | 20.34 | 31.37 | 41.23 | 49.03 |
| Std. Dev. | 6.84 | — | 6.95 | 6.66 | 5.40 | 2.83 | 2.65 | 3.74 |

As can be seen, the highest tensile elongation and highest impact strength were observed for Sample 10, which includes both the crosslinking agent and the disulfide added at the same point downstream during processing.

FIG. 11 illustrates the relationship of notched Charpy impact strength over temperature change for Sample 3 and for Sample 6. As can be seen, the polyarylene sulfide composition of Sample 6 exhibits excellent characteristics over the entire course of the temperature change, with a higher rate of increase in impact strength with temperature change as compared to the comparison material.

FIG. 12 is a scanning electron microscopy image of the polyarylene sulfide used in forming the sample 3 composition (FIG. 12A) and the Sample 6 composition (FIG. 12B). As can be seen, there is no clear boundary between the polyarylene sulfide and the impact modifier in the composition of FIG. 12B.

Tensile bar test specimens of samples 3, 6, and 10 were immersed in 10 wt. % sulfuric acid for 500 hours at either 40° C. or 80° C. Tensile properties and impact properties were measured before and after the acid exposure. Results are summarized in Table 7 below.

TABLE 7

|  | Sample 3 | Sample 6 | Sample 10 |
|---|---|---|---|
| Initial properties |  |  |  |
| Tensile Modulus (MPa) | 2076 | 2207 | 2309 |
| Tensile Break Stress (MPa) | 46.13 | 48.27 | 47.65 |
| Tensile Break Strain (%) | 33.68 | 35.94 | 63.85 |
| Charpy notched impact strength at 23° C. (kJ/m$^2$) | 22.30 | 39.40 | 39.90 |
| Properties after 500 hours exposure in sulfuric acid at 40° C. |  |  |  |
| Tensile Modulus (MPa) | 2368 | 2318 | 2327 |
| Tensile Break Stress (MPa) | 48.83 | 48.48 | 48.53 |
| Tensile Break Strain (%) | 10.99 | 28.28 | 30.05 |
| Charpy notched impact strength at 23° C. (kJ/m$^2$) | 18.4 | 33.6 | 35.9 |
| Loss in Charpy notched impact strength (%) | 18 | 15 | 15 |
| Properties after 500 hour exposure in sulfuric acid at 80° C. |  |  |  |
| Tensile Modulus (MPa) | 2341 | 2356 | 2354 |
| Tensile Break Stress (MPa) | 49.61 | 48.04 | 48.86 |
| Tensile Break Strain (%) | 10.60 | 19.88 | 26.32 |
| Charpy notched impact strength at 23° C. (kJ/m$^2$) | 9.2 | 31.0 | 34.0 |
| Loss in Charpy notched impact strength (%) | 59 | 21 | 15 |

Figure 13:
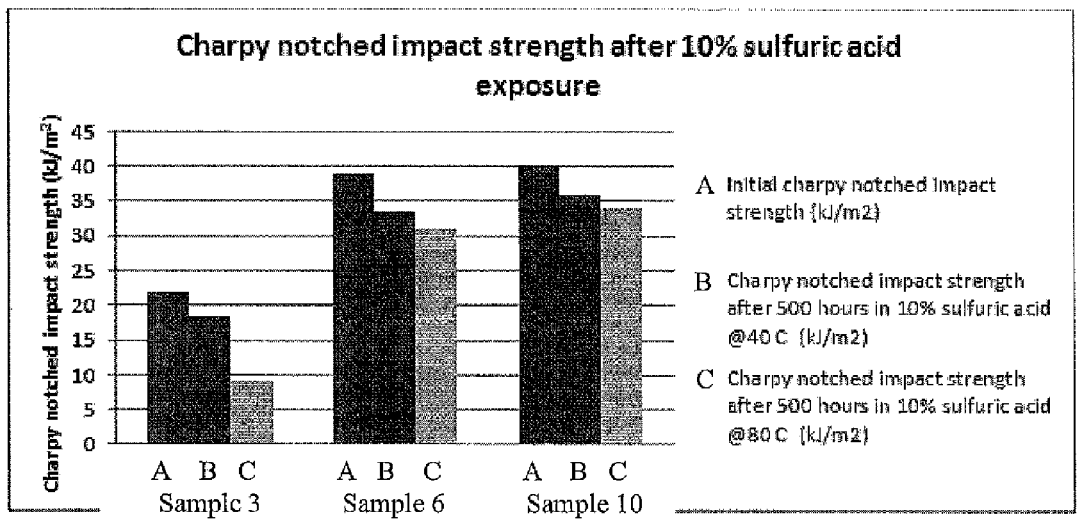
FIG. 13 compares the effect of sulfuric acid exposure on strength characteristics of polyarylene sulfide compositions as described herein and a comparison composition.

The results in the change in Charpy notched impact strength over time during exposure to the acid solution at an elevated temperature are illustrated in FIG. 13. As can be seen, the relative loss of strength of samples 6 and 10 is much less than the comparison sample.

Example 3

Materials as described in Example 1 were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the feed throat in the first barrel by means of a gravimetric feeder. The crosslinking agent was fed using a gravimetric feeder at the main feed throat and at barrel 6. Materials were further mixed then extruded through a strand die. The strands were water-quenched in a bath to solidify and granulated in a pelletizer.

Compositions of the samples are provided in Table 8, below. Amounts are provided as weight percentages based upon the weight of the sample.

TABLE 8

| Component | Addition Point | Sample 11 | Sample 12 | Sample 13 | Sample 14 |
|---|---|---|---|---|---|
| Lubricant | main feed | 0.3 | 0.3 | 0.3 | 0.3 |
| Crosslinking Agent | main feed | — | 0.5 | 1.0 | — |
| Crosslinking Agent | barrel 6 | — | — | — | 1.0 |
| Impact Modifier | main feed | 15.0 | 15.0 | 15.0 | 15.0 |
| Polyarylene Sulfide | main feed | 84.7 | 84.2 | 83.7 | 83.7 |
| Total |  | 100.0 | 100.0 | 100.0 | 100.0 |

Following formation, tensile bars formed of the samples were tested for a variety of physical characteristics. Results are provided in Table 9, below.

TABLE 9

|  | Sample 11 | Sample 12 | Sample 13 | Sample 14 |
|---|---|---|---|---|
| Melt Viscosity (poise) | 2649 | 2479 | 2258 | 3778 |
| Tensile Modulus (MPa) | 2387 | 2139 | 2150 | 1611 |
| Tensile Break Stress (MPa) | 46.33 | 49.28 | 51.81 | 42.44 |
| Tensile Break Strain (%) | 24.62 | 22.60 | 14.45 | 53.62 |
| Std. Dev. | 9.19 | 1.51 | 2.23 | 1.90 |
| Notched Charpy Impact Strength at 23° C. (kJ/m$^2$) | 27.50 | 8.50 | 6.00 | 39.30 |
| Std. Dev. | 2.7 | 1.10 | 0.60 | 2.10 |

As can be seen, upstream feed of the crosslinking agent decreased the impact properties of the composition, while downstream feed increased the tensile elongation by 118% and room temperature impact strength by 43%.

Example 4

Materials as described in Example 1 were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the feed throat in the first barrel by means of a gravimetric feeder. The crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 10, below. Amounts are provided as weight percentages based upon the weight of the sample.

TABLE 10

| Component | Addition Point | Sample 15 | Sample 16 | Sample 17 | Sample 18 |
|---|---|---|---|---|---|
| Lubricant | main feed | 0.3 | 0.3 | 0.3 | 0.3 |
| Crosslinking Agent | barrel 6 | 1.0 | 1.7 | 1.0 | 1.7 |
| Impact Modifier | main feed | 25.0 | 25.0 | 15.0 | 15.0 |
| Polyarylene Sulfide | main feed | 73.7 | 73.0 | 83.7 | 83.0 |
| Total | | 100.0 | 100.0 | 100.0 | 100.0 |

Following formation, tensile bars formed of the samples were tested for a variety of physical characteristics. Results are provided in Table 11, below.

TABLE 11

| | Sample 15 | Sample 16 | Sample 17 | Sample 18 |
|---|---|---|---|---|
| Melt Viscosity (poise) | 4255 | 4198 | 2522 | 2733 |
| Density (g/cm$^3$) | 1.2 | — | — | — |
| Tensile Modulus (MPa) | 1582.00 | 1572.00 | 2183.00 | 2189.00 |
| Tensile Break Stress (MPa) | 45.59 | 46.29 | 48.98 | 49.26 |
| Tensile Break Strain (%) | 125.92 | 116.40 | 66.13 | 48.24 |
| Std. Dev. | 19.79 | 9.97 | 15.36 | 7.80 |
| Elongation at Yield (%) | 23 | — | — | — |
| Yield Stress (MPa) | 42 | — | — | — |
| Flex Modulus (MPa) | 1946.00 | 1935.00 | 2389.00 | 2408.00 |
| Flexural Stress @3.5% (MPa) | 48.30 | 48.54 | 68.55 | 68.12 |
| Notched Charpy Impact Strength at 23° C. (kJ/m$^2$) | 55.60 | 51.80 | 43.60 | 19.10 |
| Std. Dev. | 1.00 | 1.40 | 1.50 | 1.50 |
| Notched Charpy Impact Strength at −30° C. (kJ/m$^2$) | 13 | — | — | — |
| Notched Charpy Impact Strength at −40° C. (kJ/m$^2$) | 13.30 | 12.10 | 11.26 | 8.70 |
| Std. Dev. | 1.50 | 0.90 | 0.26 | 0.50 |
| DTUL (1.8 MPa) (° C.) | 97.20 | 97.60 | 101.70 | 100.90 |
| Water absorption (%) | 0.07 | — | — | — |

Example 5

Materials as described in Example 1 were utilized except for the polyarylene sulfide, which was Fortron® 0320 linear polyphenylene sulfide available from Ticona Engineering Polymers of Florence, Ky. Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide and impact modifier were fed to the feed throat in the first barrel by means of a gravimetric feeder. The crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 12, below. Amounts are provided as weight percentages based upon the weight of the sample.

TABLE 12

| Component | Addition Point | Sample 19 | Sample 20 | Sample 21 | Sample 22 | Sample 23 |
|---|---|---|---|---|---|---|
| Crosslinking Agent | barrel 6 | — | — | — | 0.1 | 0.2 |
| Impact Modifier | main feed | — | 1.5 | 3.0 | 1.5 | 3.0 |
| Polyarylene Sulfide | main feed | 100.0 | 98.5 | 97.0 | 98.4 | 96.8 |
| Total | | 100.0 | 100.0 | 100.0 | 100.0 | 100.0 |

Following formation, tensile bars formed of the samples were tested for a variety of physical characteristics. Results are provided in Table 13, below.

TABLE 13

| | Sample 19 | Sample 20 | Sample 21 | Sample 22 | Sample 23 |
|---|---|---|---|---|---|
| Melt Viscosity (poise) | 2435 | 2684 | 2942 | 2287 | 1986 |
| Tensile Modulus (MPa) | 3208 | 3207 | 3104 | 3245 | 3179 |
| Tensile Break Stress (MPa) | 67.20 | 72.94 | 59.06 | 63.95 | 60.80 |
| Tensile Break Strain (%) | 2.46 | 4.54 | 11.96 | 6.31 | 11.40 |
| Std. Dev. | 0.32 | 1.11 | 1.24 | 2.25 | 3.53 |
| Flex Modulus (MPa) | 3103.00 | 3173.00 | 3031.00 | 3284.00 | 3156.00 |
| Flexural Stress @3.5% (MPa) | 105.76 | 104.74 | 100.21 | 109.09 | 104.81 |
| Notched Izod Impact Strength at 23° C. (kJ/m$^2$) | 2.90 | 5.20 | 5.60 | 4.10 | 4.30 |
| Std. Dev. | 0.40 | 0.40 | 0.40 | 0.20 | 0.20 |
| DTUL (1.8 MPa) (° C.) | 105.60 | 104.00 | 103.70 | 104.20 | 104.80 |

Example 6

Materials utilized to form the compositions included the following:

Polyarylene sulfide: Fortron® 0214 linear polyphenylene sulfide available from Ticona Engineering Polymers of Florence, Ky.

Impact Modifier: LOTADER® 4720—a random terpolymer of ethylene, ethyl acrylate and maleic anhydride available from Arkema, Inc.

$$-\!\!\left(\!CH_2\!-\!CH_2\!\right)_{\!x}\!\!\left(\!CH_2\!-\!CH\!\right)_{\!y}\!\!\left(\!CH\!-\!\!\!\!\!\!\overset{\overset{\displaystyle O}{\|}}{\underset{\underset{\displaystyle O}{\|}}{C}}\!\!\!\!\!\!-\!\!\!\!\!\!\overset{\overset{\displaystyle O}{\|}}{\underset{\underset{\displaystyle O}{\|}}{C}}\!\!\!\!\!\!-\!CH\!\right)_{\!z}\!\!-$$

Crosslinking Agent: Hydroquinone

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at the main feed for samples 24 and 25 and at barrel 6 for samples 26 and 27. Materials were further mixed then extruded through a strand die. The strands were water-quenched in a bath to solidify and granulated in a pelletizer.

Compositions of the samples are provided in Table 14, below. Amounts are provided as weight percentages based upon the weight of the sample.

TABLE 14

| Component | Addition Point | Sample 24 | Sample 25 | Sample 26 | Sample 27 | Sample 28 |
|---|---|---|---|---|---|---|
| Lubricant | main feed | 0.3 | 0.3 | 0.3 | 0.3 | 0.3 |
| Crosslinking Agent | barrel 6 | — | — | — | 0.1 | 0.2 |
| Crosslinking Agent | main feed | — | 0.1 | 0.2 | — | — |
| Impact Modifier | main feed | 15.0 | 15.0 | 15.0 | 15.0 | 15.0 |
| Polyarylene Sulfide | main feed | 84.7 | 84.6 | 84.5 | 84.6 | 84.5 |
| Total | | 100.0 | 100.0 | 100.0 | 100.0 | 100.0 |

Following formation, samples were tested for a variety of physical characteristics. Results are provided in Table 15, below.

TABLE 15

| | Sample 24 | Sample 25 | Sample 26 | Sample 27 | Sample 28 |
|---|---|---|---|---|---|
| Melt Viscosity (poise) | 2435 | 2797 | 3251 | 2847 | 2918 |
| Tensile Modulus (MPa) | 2222 | 2164 | 2163 | 2184 | 2145 |
| Tensile Break Stress (MPa) | 52.03 | 45.17 | 46.53 | 45.47 | 46.39 |
| Tensile Break Strain (%) | 36.65 | 50.91 | 63.39 | 38.93 | 41.64 |
| Std. Dev. | 9.09 | 14.9 | 11.88 | 7.62 | 10.42 |
| Elongation at Yield (%) | 5.75 | 5.49 | 5.76 | 5.53 | 5.70 |
| Yield Stress (MPa) | 52.03 | 50.21 | 50.77 | 51.39 | 50.85 |
| Flexural Modulus (MPa) | 2358.00 | 2287.00 | 2286.00 | 2305.00 | 2281.00 |
| Flexural Stress @3.5% (MPa) | 70.51 | 68.25 | 68.03 | 69.23 | 68.23 |
| Notched Charpy Impact Strength at 23° C. (kJ/m²) | 29.80 | 44.60 | 50.60 | 42.30 | 45.90 |
| Std. Dev. | 4.10 | 2.40 | 1.90 | 1.90 | 1.60 |
| Notched Charpy Impact Strength at −40° C. (kJ/m²) | 5.90 | 9.30 | 11.00 | 9.60 | 9.80 |
| Std. Dev. | 1.00 | 0.90 | 1.20 | 0.80 | 1.30 |
| DTUL (1.8 MPa) (° C.) | 99.10 | 93.90 | 98.20 | 100.10 | 99.00 |

Example 7

Materials utilized to form the compositions included the following:

Polyarylene sulfide:

PPS1—Fortron® 0203 linear polyphenylene sulfide available from Ticona Engineering Polymers of Florence, Ky.

PPS2—Fortron®0205 linear polyphenylene sulfide available from Ticona Engineering Polymers of Florence, Ky.

PPS3—Fortron®0320 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 16, below. Amounts are provided as weight percentages based upon the weight of the sample.

TABLE 16

| Component | Addition Point | Sample 29 | Sample 30 | Sample 31 | Sample 32 | Sample 33 | Sample 34 |
|---|---|---|---|---|---|---|---|
| Lubricant | main feed | 0.3 | 0.3 | 0.3 | 0.3 | 0.3 | 0.3 |
| Crosslinking Agent | barrel 6 | | 1.0 | | 1.0 | | 1.0 |
| Impact Modifier | main feed | 15.0 | 15.0 | 15.0 | 15.0 | 15.0 | 15.0 |
| PPS1 | main feed | 84.7 | 83.7 | | | | |

TABLE 16-continued

| Component | Addition Point | Sample 29 | Sample 30 | Sample 31 | Sample 32 | Sample 33 | Sample 34 |
|---|---|---|---|---|---|---|---|
| PPS2 | main feed | | | 84.7 | 83.7 | | |
| PPS3 | main feed | | | | | 84.7 | 83.7 |
| Total | | 100.0 | 100.0 | 100.0 | 100.0 | 100.0 | 100.0 |

Following formation, samples were tested for a variety of physical characteristics. Results are provided in Table 17, below.

TABLE 17

| | Sample 29 | Sample 30 | Sample 31 | Sample 32 | Sample 33 | Sample 34 |
|---|---|---|---|---|---|---|
| Tensile Modulus (MPa) | 2292 | 2374 | 2250 | 2427 | 2130 | 2285 |
| Tensile Break Stress (MPa) | 50.92 | 50.18 | 49.18 | 53.22 | 48.01 | 48.08 |
| Tensile Break Strain (%) | 5.79 | 2.84 | 23.79 | 34.73 | 23.55 | 45.42 |
| Std. Dev. | 0.99 | 0.18 | 11.96 | 4.01 | 18.57 | 18.94 |
| Flexural Modulus (MPa) | 2279.00 | 2382.00 | 2257.00 | 2328.00 | 2292.00 | 2294.00 |
| Flexural Stress @3.5% (MPa) | 71.11 | 74.94 | 69.72 | 72.39 | 67.95 | 68.95 |
| Notched Charpy Impact Strength at 23° C. (kJ/m$^2$) | 5.70 | 3.70 | 9.10 | 12.80 | 19.40 | 45.40 |
| Std. Dev. | 0.90 | 0.70 | 0.80 | 1.00 | 2.70 | 7.70 |

TABLE 17-continued

| | Sample 29 | Sample 30 | Sample 31 | Sample 32 | Sample 33 | Sample 34 |
|---|---|---|---|---|---|---|
| Notched Charpy Impact Strength at −40° C. (kJ/m$^2$) | 3.00 | 2.50 | 5.10 | 5.00 | 5.10 | 8.00 |
| Std. Dev. | 0.70 | 0.30 | 0.60 | 0.30 | 0.40 | 1.00 |
| DTUL (1.8 MPa) (° C.) | 101.00 | 105.50 | 100.00 | 102.90 | 99.90 | 100.40 |

Example 8

Materials utilized to form the compositions included the following:

Polyarylene sulfide: Fortron® 0214 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 18, below. Amounts are provided as weight percentages based upon the weight of the sample.

TABLE 18

| Component | Addition Point | Sample 35 | Sample 36 | Sample 37 | Sample 38 | Sample 39 | Sample 40 |
|---|---|---|---|---|---|---|---|
| Lubricant | main feed | 0.3 | 0.3 | 0.3 | 0.3 | 0.3 | 0.3 |
| Crosslinking Agent | barrel 6 | | 0.75 | | 1.25 | | 1.75 |
| Impact Modifier | main feed | 15.0 | 15.0 | 25.0 | 25.0 | 35.0 | 35.0 |
| Polyarylene Sulfide | main feed | 84.7 | 83.95 | 74.70 | 73.45 | 64.70 | 62.95 |
| Total | | 100.0 | 100.0 | 100.0 | 100.0 | 100.0 | 100.0 |

Following formation, samples were tested for a variety of physical characteristics. Results are provided in Table 19, below. Sample 39 was not injection moldable.

TABLE 19

| | Sample 35 | Sample 36 | Sample 37 | Sample 38 | Sample 39 | Sample 40 |
|---|---|---|---|---|---|---|
| Melt Viscosity (poise) | 2323 | 2452 | 2955 | 3821 | 2025 | 5462 |
| Tensile Modulus (MPa) | 2281 | 2298 | 2051 | 1721 | — | 1045 |
| Tensile Break Stress (MPa) | 47.09 | 49.09 | 47.29 | 46.18 | — | 39.81 |
| Tensile Break Strain (%) | 28.92 | 36.42 | 97.33 | 110.36 | — | 96.76 |

TABLE 19-continued

| | Sample 35 | Sample 36 | Sample 37 | Sample 38 | Sample 39 | Sample 40 |
|---|---|---|---|---|---|---|
| Std. Dev. | 6.35 | 3.13 | 53.94 | 8.40 | — | 1.77 |
| Elongation at Yield (%) | 5.28 | 8.58 | 36.00 | 108.19 | — | 95.77 |
| Yield Stress (MPa) | 52.42 | 53.92 | 46.50 | 46.76 | — | 40.43 |
| Flexural Modulus (MPa) | 2388.00 | 2349.00 | 2210.00 | 1750.00 | — | 1209.00 |
| Flexural Stress @3.5% (MPa) | 71.52 | 71.70 | 63.15 | 50.52 | — | 34.41 |
| Notched Charpy Impact Strength at 23° C. (kJ/m$^2$) | 35.15 | 38.40 | 57.00 | 52.70 | — | 52.10 |
| Std. Dev. | 6.22 | 1.50 | 1.40 | 3.40 | — | 2.10 |
| Notched Charpy Impact Strength at −30° C. (kJ/m$^2$) | 8.20 | 10.70 | 8.70 | 18.10 | — | 14.10 |
| Std. Dev. | 1.50 | 1.60 | 0.20 | 0.90 | — | 0.80 |
| Notched Charpy Impact Strength at −40° C. (kJ/m$^2$) | 7.26 | 9.20 | 8.00 | 16.80 | — | 12.47 |
| Std. Dev. | 1.54 | 2.30 | 0.60 | 0.40 | — | 0.92 |
| DTUL (1.8 MPa) (° C.) | 99.90 | 103.60 | 98.10 | 99.30 | — | 92.70 |
| Water absorption (%) | — | — | — | — | — | 0.1 |

Example 9

Materials utilized to form the compositions included the following:

Polyarylene sulfide: Fortron® 0214 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 20, below. Amounts are provided as weight percentages based upon the weight of the sample.

TABLE 20

| Component | Addition Point | Sample 41 | Sample 42 | Sample 43 | Sample 44 |
|---|---|---|---|---|---|
| Lubricant | main feed | 0.3 | 0.3 | 0.3 | 0.3 |
| Crosslinking Agent | barrel 6 | 1.0 | 1.1 | 1.25 | 1.25 |
| Impact Modifier | main feed | 15 | 20 | 25 | 30 |
| Polyarylene Sulfide | main feed | 83.7 | 78.6 | 73.45 | 68.45 |
| Total | | 100.0 | 100.0 | 100.0 | 100.0 |

Following formation, samples were tested for a variety of physical characteristics. Results are provided in Table 21, below.

TABLE 21

| | Sample 41 | Sample 42 | Sample 43 | Sample 44 |
|---|---|---|---|---|
| Specific Gravity (g/cm$^3$) | 1.25 | 1.20 | 1.15 | 1.20 |
| Tensile Modulus (MPa) (50 mm/min) | 2200 | 1600 | 1200 | 1700 |
| Tensile Break Strength (MPa) (50 mm/min) | 50 | 42 | 40 | 46 |
| Elongation at Break (%) (50 mm/min) | 40 | 100 | 90 | 75 |
| Yield Stress (MPa) (50 mm/min) | 55 | 42 | 40 | 48 |
| Yield Strain (%) (50 mm/min) | 9 | 25 | 90 | 15 |
| Flexural Modulus (MPa) | 2200 | 1700 | 1300 | 1900 |
| Flexural Strength @3.5% (MPa) | 68 | 50 | 40 | 56 |
| Notched Charpy Impact Strength at 23° C. (kJ/m$^2$) | 40 | 55 | 50 | 50 |
| Notched Charpy Impact Strength at −30° C. | 10 | 24 | 20 | 20 |
| Unnotched Charpy Impact Strength at 23° C. | Not broken | Not broken | Not broken | Not broken |
| DTUL (1.8 MPa) (° C.) | 102 | 100 | 95 | 100 |
| Water absorption (%) | 0.05 | 0.07 | 0.1 | 0.05 |
| Vicat softening temp. (A10N, ° C.) | 270 | 270 | 270 | 270 |
| Vicat softening temp. (B50N, ° C.) | 200 | 160 | 110 | 180 |
| Complex viscosity (0.1 rad/sec, 310° C.) (kPa/sec) | 79.994 | 289.27 | 455.19 | — |
| Hydrocarbon volume uptake (%) | 14 | 23 | | 19 |

Figure 14:
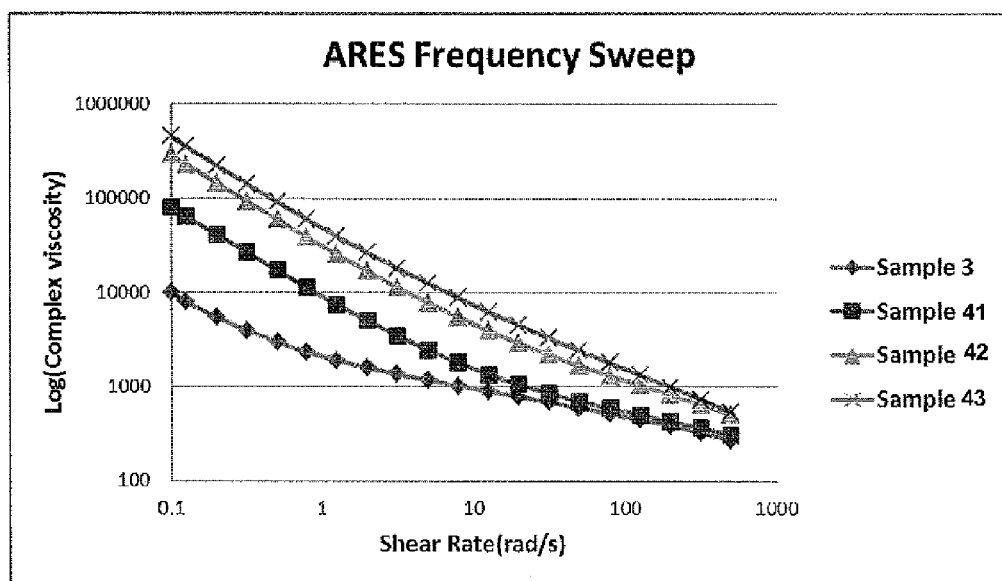
FIG. 14 provides the log of the complex viscosity obtained for polyarylene sulfide compositions described herein as a function of the shear rate.
Figure 15:
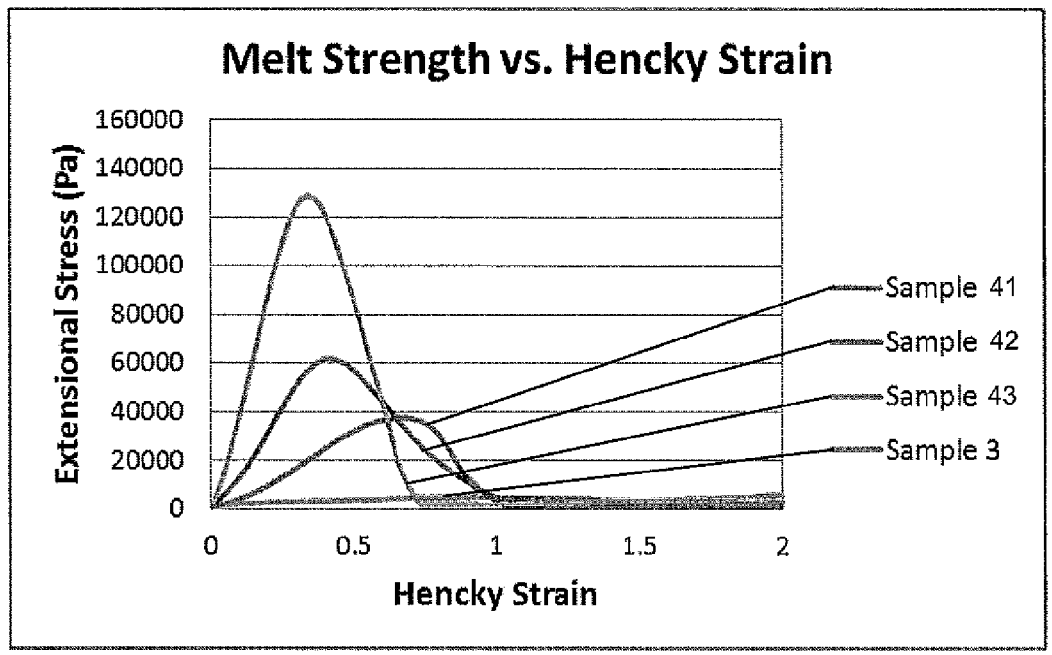
FIG. 15 provides the melt strength of polyarylene sulfide compositions described herein as a function of the Hencky strain.
Figure 16:
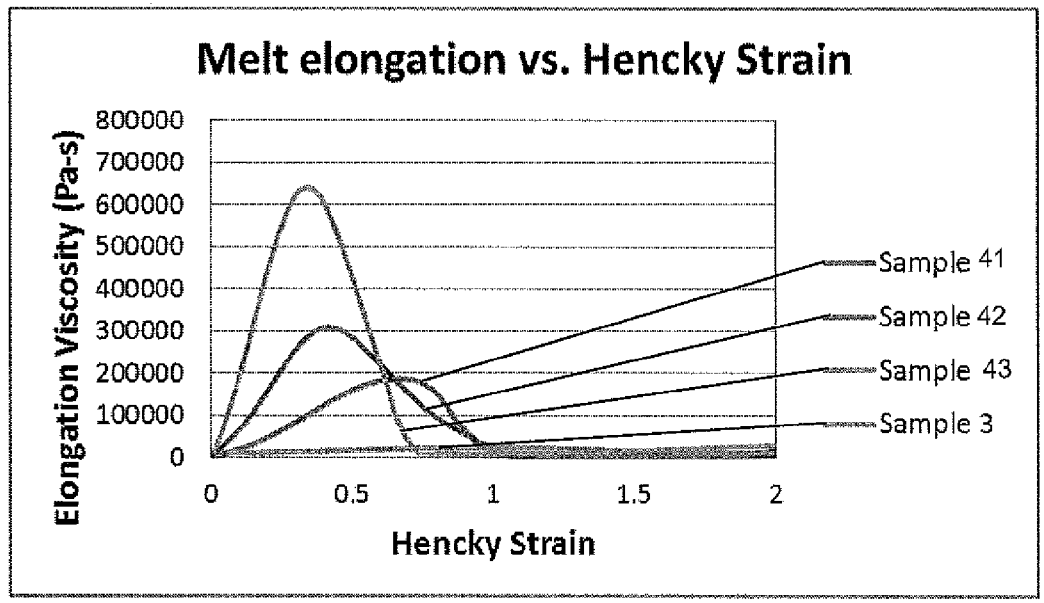
FIG. 16 provides the melt elongation for polyarylene sulfide compositions described herein as a function of Hencky strain.

Samples 41, 42, and 43 were tested to determine complex viscosity as well as melt strength and melt elongation as a function of Hencky strain. As a comparative material, Sample 3 as described in Example 2 was utilized. Samples 41, 42 and 43 were done at 310° C. and sample 3 was done at 290° C. Results are shown in FIG. 14, FIG. 15, and FIG. 16.

Example 10

Figure 17:
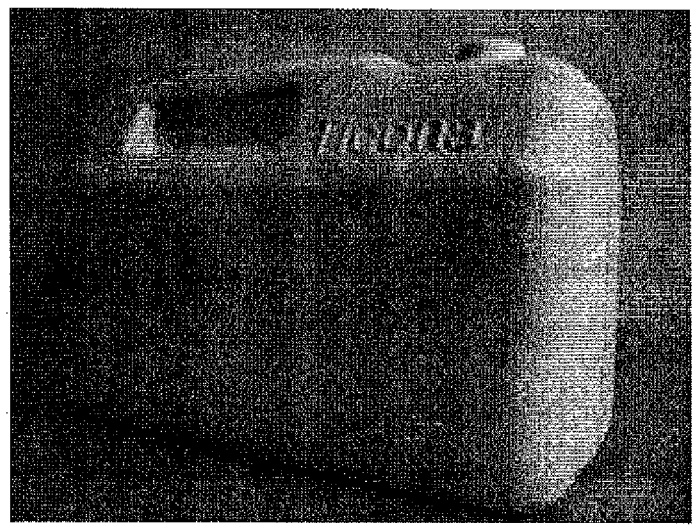
FIG. 17 illustrates a blow molded container formed of the polyarylene sulfide composition.
Figure 18A:
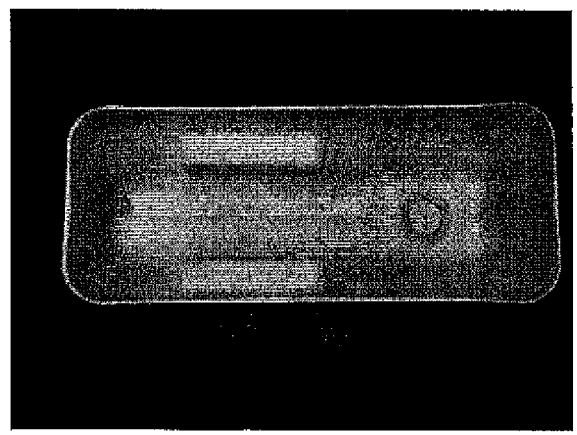
FIG. 18A and FIG. 18B are cross sectional images of the container shown in FIG. 17.
Figure 18B:
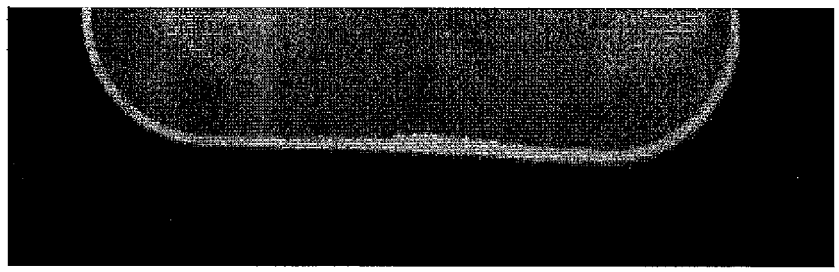

Sample 42 described in Example 9 was utilized to form a blow molded 1.6 gallon tank. The formed tank is illustrated in FIG. 17. Cross sectional views of the tank are presented in FIG. 18A and FIG. 18B. The formed tank has a good outer surface with regard to both visual inspection and feel. As shown in FIG. 18A, an even wall thickness (about 3 mm) was obtained and minimal sag was observed. As shown in FIG. 18B, the pinch-offs formed an excellent geometry.

Example 11

Samples 41, 42, and 43 described in Example 9 were tested to determine permeation of various fuels including CE10 (10 wt. % ethanol, 45 wt. % toluene, 45 wt. % iso-octane), CM15A (15 wt. % methanol and 85 wt. % oxygenated fuel), and methanol. Sample No. 4 described in Example 2 was utilized as a comparison material. Two samples of each material were tested.

Table 22, below provides the average sample thickness and effective area for the samples tested with each fuel.

TABLE 22

| Sample | Average Sample Thickness (mm) | Effective area (m$^2$) |
|---|---|---|
| CE10 | | |
| Aluminum blank-1 | 1.50 | 0.00418 |
| Aluminum blank-2 | 1.50 | 0.00418 |
| Sample No. 4-1 | 1.47 | 0.00418 |
| Sample No. 4-2 | 1.45 | 0.00418 |
| Sample No. 41-1 | 1.47 | 0.00418 |
| Sample No. 41-2 | 1.49 | 0.00418 |
| Sample No. 42-1 | 1.47 | 0.00418 |
| Sample No. 42-2 | 1.46 | 0.00418 |
| Sample No. 43-1 | 1.45 | 0.00418 |
| Sample No. 43-2 | 1.47 | 0.00418 |
| CM15A | | |
| Aluminum blank-1 | 1.50 | 0.00418 |
| Aluminum blank-2 | 1.50 | 0.00418 |
| Sample No. 4-1 | 1.48 | 0.00418 |
| Sample No. 4-2 | 1.49 | 0.00418 |
| Sample No. 41-1 | 1.49 | 0.00418 |
| Sample No. 41-2 | 1.50 | 0.00418 |
| Sample No. 42-1 | 1.47 | 0.00418 |
| Sample No. 42-2 | 1.48 | 0.00418 |
| Sample No. 43-1 | 1.46 | 0.00418 |
| Sample No. 43-2 | 1.47 | 0.00418 |
| Methanol | | |
| Aluminum blank-1 | 1.50 | 0.00418 |
| Aluminum blank-2 | 1.50 | 0.00418 |
| Sample No. 4-1 | 1.49 | 0.00418 |
| Sample No. 4-2 | 1.49 | 0.00418 |
| Sample No. 41-1 | 1.49 | 0.00418 |
| Sample No. 41-2 | 1.51 | 0.00418 |
| Sample No. 42-1 | 1.48 | 0.00418 |
| Sample No. 42-2 | 1.47 | 0.00418 |
| Sample No. 43-1 | 1.47 | 0.00418 |
| Sample No. 43-2 | 1.48 | 0.00418 |

Figure 19:
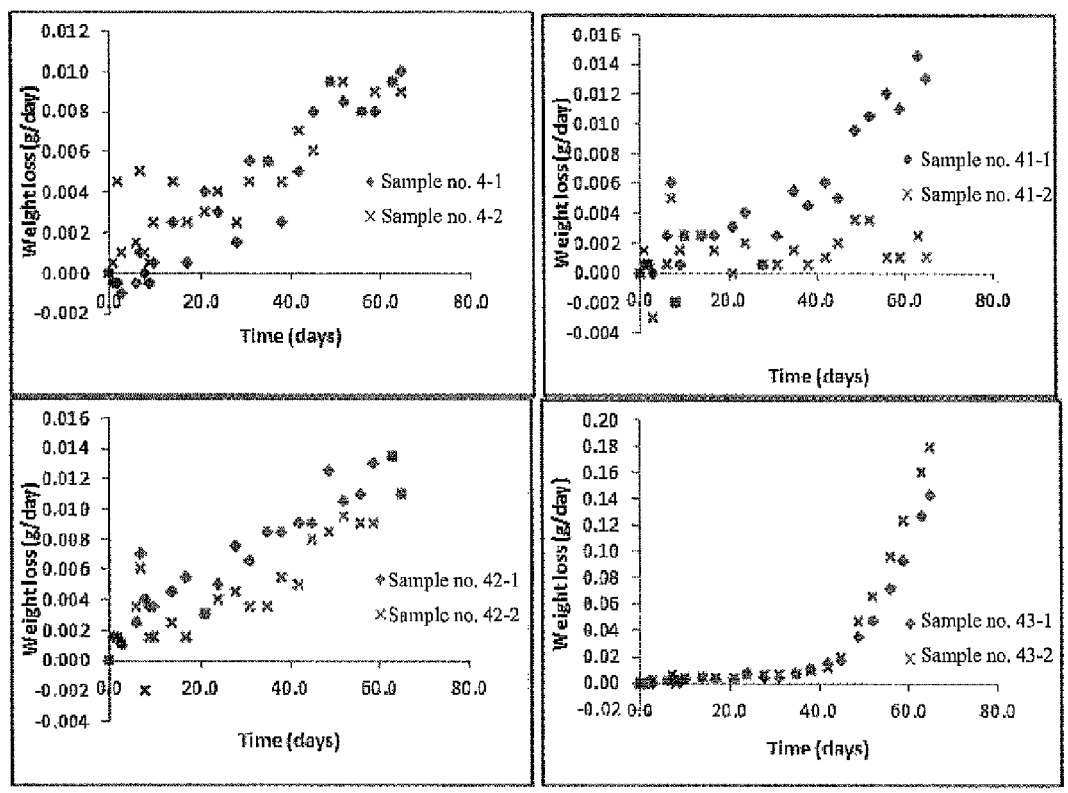
FIG. 19 illustrates the daily weight loss for testing samples in determination of permeation resistance of polyarylene sulfide compositions to CE10 fuel blend.
Figure 20:
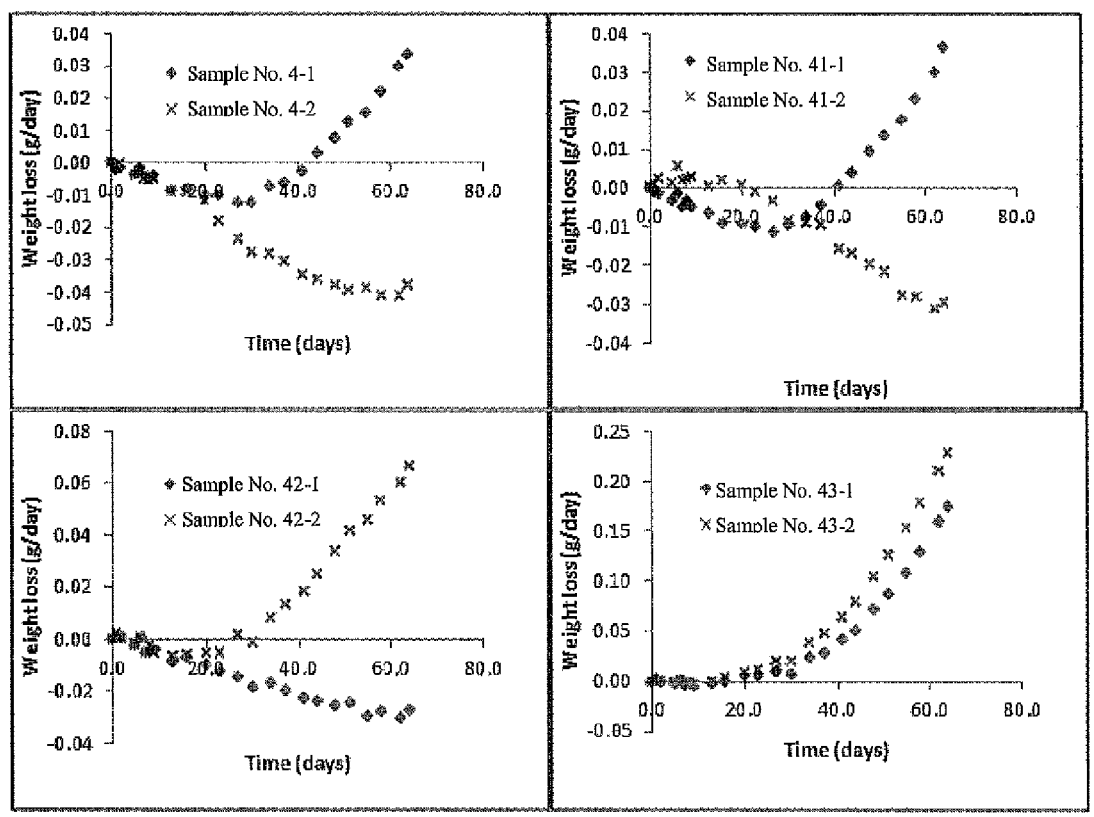
FIG. 20 illustrates the daily weight loss for testing samples in determination of permeation resistance of polyarylene sulfide compositions to CM15A fuel blend.
Figure 21:
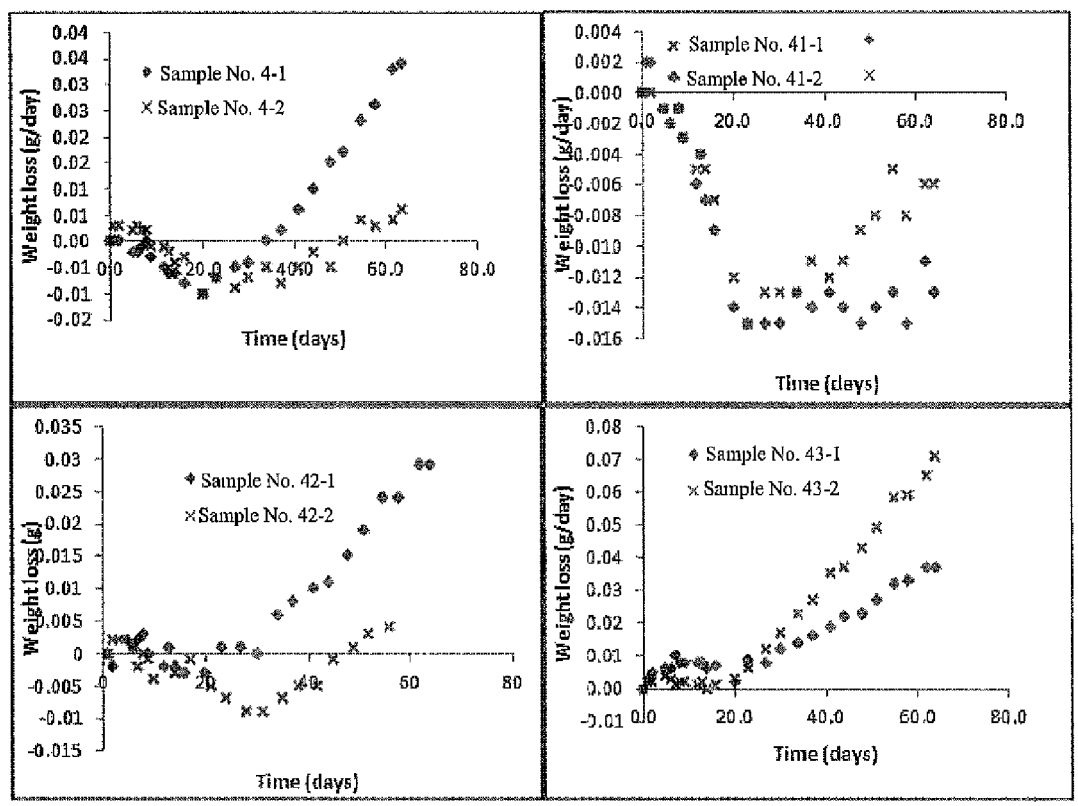
FIG. 21 illustrates the daily weight loss for testing samples in determination of permeation resistance of polyarylene sulfide compositions to methanol.

The daily weight losses for each material and each fuel are shown in FIGS. 19-21. Specifically, FIG. 19 shows the daily weight loss for the samples during the permeation test of CE10, FIG. 20 shows the daily weight loss for the samples during the permeation test of CM15A, and FIG. 21 shows the daily weight loss for the samples during the permeation test of methanol.

The average permeation rates for each sample with each fuel are provided in Table 23. Note that Sample No. 43 takes a longer time to arrive at equilibrium, so the linear regression fitting was generated based on data between days 42 and 65 for this material, while the linear regress fitting was generated for the other materials between days 32 and 65. For methanol, the linear regression fitting was generated based on data between days 20 and 65, but with Sample No. 604, the methanol linear regression fitting was generated based on data between days 30 and 65. Some samples show negative permeability, which is because the weight loss of the sample was lower than that of the aluminum blank.

TABLE 23

| Sample | Normalized permeation (g-mm/day-m$^2$) | Average Normalized permeation (g-mm/day-m$^2$) | Permeation - 3 mm thickness | Average Permeation - 3 mm thickness |
|---|---|---|---|---|
| CE10 | | | | |
| Sample No. 4-1 | 0.06 | 0.05 ± 0.01 | 0.02 | 0.02 ± 0 |
| Sample No. 4-2 | 0.05 | | 0.02 | |
| Sample No. 41-1 | 0.07 | 0.04 ± 0.04 | 0.02 | 0.01 ± 0.01 |
| Sample No. 41-2 | 0.01 | | 0.00 | |
| Sample No. 42-1 | 0.06 | 0.06 ± 0 | 0.02 | 0.02 ± 0 |
| Sample No. 42-2 | 0.06 | | 0.02 | |
| Sample No. 43-1 | 2020 | 2.51 ± 0.43 | 0.73 | 0.84 ± 0.14 |
| Sample No. 43-2 | 2.81 | | 0.94 | |
| CM15A | | | | |
| Sample No. 4-1 | 0.49 | 0.18 ± 0.44 | 0.16 | 0.06 ± 0.15 |
| Sample No. 4-2 | −0.13 | | −0.04 | |
| Sample No. 41-1 | 0.50 | 0.11 ± 0.55 | 0.17 | 0.04 ± 0.18 |
| Sample No. 41-2 | −0.27 | | −0.09 | |
| Sample No. 42-1 | −0.13 | 0.27 ± 0.58 | −0.04 | 0.09 ± 0.19 |
| Sample No. 42-2 | 0.68 | | 0.23 | |
| Sample No. 43-1 | 2.04 | 2.29 ± 0.35 | 0.68 | 0.76 ± 0.12 |
| Sample No. 43-2 | 2.53 | | 0.84 | |
| Methanol | | | | |
| Sample No. 4-1 | 0.37 | 0.25 ± 0.18 | 0.12 | 0.08 ± 0.06 |
| Sample No. 4-2 | 0.13 | | 0.04 | |
| Sample No. 41-1 | 0.02 | 0.05 ± 0.05 | 0.01 | 0.02 ± 0.02 |
| Sample No. 41-2 | 0.08 | | 0.03 | |
| Sample No. 42-1 | 0.28 | 0.25 ± 0.05 | 0.09 | 0.08 ± 0.02 |
| Sample No. 42-2 | 0.21 | | 0.07 | |
| Sample No. 43-1 | 0.27 | 0.41 ± 0.2 | 0.09 | 0.14 ± 0.07 |
| Sample No. 43-2 | 0.55 | | 0.18 | |

The error was derived from the standard deviation of duplicates in each sample.

These and other modifications and variations to the present disclosure may be practiced by those of ordinary skill in the art, without departing from the spirit and scope of the present disclosure. In addition, it should be understood the aspects of the various embodiments may be interchanged, either in whole or in part. Furthermore, those of ordinary skill in the art will appreciate that the foregoing description is by way of example only, and is not intended to limit the disclosure.

What is claimed is:

1. A flowline for an oil and/or gas production application, the flowline having a tubular shape and defining a bore for carrying a fluid, wherein the flowline contains a layer that comprises a polyarylene sulfide composition, the polyarylene sulfide composition of the flowline being formed by melt processing (i) a linear polyarylene sulfide containing less than about 1 mol. % of cross-linking units based on the total monomer units of the polyarylene sulfide, (ii) from 20 wt. % to 35 wt. % of an epoxy-functionalized impact modifier, and (iii) from 1.0 wt. % to 1.75 wt. % of a polyfunctional crosslinking agent that includes a dicarboxylic acid, wherein the crosslinking agent is supplied following distribution of the impact modifier with the polyarylene sulfide, and wherein the melt processing forms a crosslinked epoxy-functionalized impact modifier that is a reaction product of epoxy-functionalized monomer units and a polyfunctional crosslinking agent, wherein the composition exhibits a tensile elongation at break of 70% or more as determined in accordance with ISO Test No. 527 at a temperature of 23° C. and at a speed of 50 mm/min.

2. The flowline of claim 1, wherein the polyarylene sulfide composition has
   an elongation at yield of greater than about 4.5% as determined according to ISO Test No. 527 at a temperature of 23° C. and a speed of 5 mm/min; and/or
   a tensile modulus of less than about 3000 MPa as determined according to ISO Test No. 527 at a temperature of 23° C. and a speed of 5 mm/min.

3. The flowline of claim 1, wherein the flowline is a riser, a bundled flowline, a support fluid flowline, or a pipe-in-pipe.

4. The flowline of claim 1, further comprising a fitting, connector, anchor mooring, buoy, or yoke, attached to the flowline, the fitting, connector, anchor, mooring, buoy, or yoke comprising the polyarylene sulfide composition.

5. The flowline of claim 1, wherein the polyarylene sulfide is not functionalized.

6. The flowline of claim 1, further comprising one or more additives.

7. The flowline of claim 1, wherein the oil and/or gas production application is an offshore production application or an onshore production application.

8. The flowline of claim 1, wherein the polyarylene sulfide composition is free of plasticizers.

9. The flowline of claim 1, wherein the polyarylene sulfide composition has an elongation at yield of greater than about 7% as determined according to ISO Test No. 527 at a temperature of 23° C. and a speed of 5 mm/min and/or a tensile modulus of less than about 2300 MPa as determined according to ISO Test No. 527 at a temperature of 23° C. and a speed of 5 mm/min.

10. The flowline of claim 1, wherein the polyarylene sulfide composition has a deflection temperature under load of greater than about 90° C. as measured according to ISO Test No. 75 at 1.8 MPa.

11. The flowline of claim 1, wherein the polyarylene sulfide composition has a notched Charpy impact strength of greater than about 3 kJ/m$^2$ as measured according to ISO Test No. 179-1 at a temperature of 23° C. and/or a loss in Charpy notched impact strength as determined according to ISO Test No, 179-1 at 23° C. of less than about 17% following exposure of about 500 hours to a strong acid solution at a temperature of about 80° C.

12. The flowline of claim 1, wherein the polyarylene sulfide composition has a notched Charpy impact strength of greater than about 8 kJ/m$^2$ as measured according to ISO Test No. 179-1 at a temperature of 23° C. and/or a loss in Charpy notched impact strength as determined according to ISO Test No. 179-1 at 23° C. of less than about 25% following exposure of about 500 hours to a strong acid solution at a temperature of about 80° C.

13. The flowline of claim 1, wherein the polyarylene sulfide composition has a tensile break stress of greater than about 30 MPa as measured according to ISO Test No. 527 at a temperature of 23° C. and a test speed of 5 mm/min and/or a tensile break strain of greater than about 25% as measured according to ISO Test No. 527 at a temperature of 23° C. and a test speed of 5 mm/min.

14. The flowline of claim 1, wherein the polyarylene sulfide composition has a halogen content of less than about 1000 ppm.

15. The flowline of claim 1, wherein the polyarylene sulfide composition meets the V-0 flammability standard at a thickness of 0.2 millimeters.

16. The flowline of claim 1, wherein the polyarylene sulfide composition exhibits a permeation resistance to a fuel or a fuel source of less than about 3 g-mm/m$^2$-day as determined according to SAE Testing Method No. J2665.

17. The flowline of claim 1, wherein the epoxy-functionalized impact modifier includes methacrylic monomer units.

18. The flowline of claim 17, the epoxy-functionalized impact modifier further includes α-olefin monomer units.

19. The flowline of claim 1, wherein the dicarboxylic acid includes terephthalic acid.

20. The flowline of claim 1, wherein the epoxy-functionalized monomer units include epoxy-functionalized methacrylic monomer units.

21. The flowline of claim 1, wherein polyarylene sulfides constitute from about 20% wt. % to about 78.6 wt. % by weight of the composition.

22. The flowline of claim 1, wherein the polyarylene sulfide is functionalized.

23. The flowline of claim 22, wherein the functionalized polyarylene sulfide is a reaction product of a polyarylene sulfide and a disulfide compound having a reactive functionality.

24. The flowline of claim 1, wherein the flowline contains multiple layers, at least one of which contains the polyarylene sulfide composition.

25. The flowline of claim 24, wherein the flowline contains an inner carcass that supports and adjacent barrier layer.

26. The flowline of claim 25, wherein the barrier layer contains the polyarylene sulfide composition.

27. The flowline of claim 25, wherein the flowline further contains an outer layer, the outer layer containing the polyarylene sulfide composition.

28. The flowline of claim 1, wherein the flowline contains a single layer.

29. A system that comprises the flowline of claim 1 in combination with a fluid.

30. The system of claim 29, wherein the fluid is an injection fluid.

31. The system of claim 29, wherein the fluid is a production fluid.

32. The flowline of claim 1, wherein the composition exhibits a tensile elongation at break of about 80 or more.

* * * * *